US011485674B2

(12) United States Patent
Guo et al.

(10) Patent No.: US 11,485,674 B2
(45) Date of Patent: Nov. 1, 2022

(54) GLASSES HAVING HIGH FRACTURE TOUGHNESS

(71) Applicant: CORNING INCORPORATED, Corning, NY (US)

(72) Inventors: Xiaoju Guo, Painted Post, NY (US); Peter Joseph Lezzi, Corning, NY (US); Jian Luo, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 623 days.

(21) Appl. No.: 16/370,002

(22) Filed: Mar. 29, 2019

(65) Prior Publication Data
US 2019/0300422 A1 Oct. 3, 2019

Related U.S. Application Data

(60) Provisional application No. 62/649,958, filed on Mar. 29, 2018.

(51) Int. Cl.
| | |
|---|---|
| *C03C 3/087* | (2006.01) |
| *C03C 21/00* | (2006.01) |
| *C03C 3/085* | (2006.01) |
| *C03C 3/091* | (2006.01) |
| *C03C 3/095* | (2006.01) |
| *G02F 1/1333* | (2006.01) |

(52) U.S. Cl.
CPC .............. *C03C 3/095* (2013.01); *C03C 3/087* (2013.01); *C03C 3/091* (2013.01); *G02F 1/133308* (2013.01); *C03C 21/002* (2013.01); *C03C 2201/10* (2013.01); *C03C 2201/28* (2013.01); *C03C 2201/32* (2013.01); *C03C 2201/3411* (2013.01); *C03C 2201/36* (2013.01); *C03C 2201/42* (2013.01); *C03C 2201/50* (2013.01); *G02F 1/133331* (2021.01)

(58) Field of Classification Search
CPC ......... C03C 3/085; C03C 3/087; C03C 3/091; C03C 3/095; C03C 21/00; C03C 211/002
See application file for complete search history.

(56) References Cited

U.S. PATENT DOCUMENTS

| | | | |
|---|---|---|---|
| 3,513,004 A | 5/1970 | Jaroslaw et al. | |
| 3,615,769 A | 10/1971 | Leitz et al. | |
| 3,785,836 A | 1/1974 | Bacon | |
| 3,804,646 A | 4/1974 | Dumbaugh | |
| 3,811,901 A | 5/1974 | Bacon | |
| 6,268,304 B1 | 7/2001 | Maeda et al. | |
| 6,306,786 B1 | 10/2001 | Koyama et al. | |
| 7,192,898 B2 | 3/2007 | Mori et al. | |
| 7,659,222 B2 | 2/2010 | Shimizu | |
| 8,304,078 B2 | 11/2012 | Varshneya | |
| 8,361,917 B2 | 1/2013 | Li et al. | |
| 8,652,978 B2 | 2/2014 | Dejneka et al. | |
| 8,796,165 B2 | 8/2014 | Ellison et al. | |
| 8,969,226 B2 | 3/2015 | Dejneka et al. | |
| 9,096,460 B2 | 8/2015 | Brix et al. | |
| 9,212,084 B2 | 12/2015 | Wang et al. | |
| 9,682,885 B2 | 6/2017 | Gross | |
| 9,695,081 B2 | 7/2017 | Bookbinder et al. | |
| 10,280,112 B2 | 5/2019 | Gross | |
| 2009/0239102 A1 | 9/2009 | Nagashima et al. | |
| 2010/0009154 A1* | 1/2010 | Allan | C03C 21/002 428/220 |
| 2012/0188663 A1 | 7/2012 | Isono et al. | |
| 2014/0141226 A1 | 5/2014 | Bookbinder et al. | |
| 2015/0140325 A1 | 5/2015 | Gross et al. | |
| 2016/0102011 A1 | 4/2016 | Hu et al. | |

(Continued)

FOREIGN PATENT DOCUMENTS

| | | |
|---|---|---|
| CN | 1886348 A | 12/2006 |
| CN | 101910079 A | 12/2010 |

(Continued)

OTHER PUBLICATIONS

Johnson et al., "On The Shape And Size Of The Fracture Zones On Glass Fracture Surfaces"; The Philosophical Magazine: A Journal Of Theoretical Experimental And Applied Physics; vol. 14, No. 130, 1966, pp. 731-743.

Ali; "Preparation, Characterization and Properties of Nitrogen Rich Glasses in Alkaline Earth-Si—O—N Systems"; Ph.D Thesis, Stockholm University, (2009); 123 Pages.

Bradt; "Applying Fractography and Fracture Mechanics to the Energy and Mass of Crack Growth for Glass in the Mirror Region"; J. Eur. Ceram. Soc. 34, 3255-3262, (2014).

Bubsey et al; "Closed-Form Expressions for-Crack-Mouth Displacement and Stress Intensity Factors for Chevron-Notched Short Bar and Short Rod Specimens Based on Experimental Compliance Measurements"; NASA Technical Memorandum 83796, pp. 1-30 (Oct. 1992).

Dugnani et al; "Analytical Model of Dynamic Crack Evolution in Tempered and Strengthened Glass Plates"; Int J Fract 190, 75-86, (2014).

(Continued)

*Primary Examiner* — Elizabeth A. Bolden
(74) *Attorney, Agent, or Firm* — Kevin M. Johnson

(57) ABSTRACT

A glass composition includes: 50 mol % to 69 mol % $SiO_2$; 12.5 mol % to 25 mol % $Al_2O_3$; 0 mol % to 8 mol % $B_2O_3$; greater than 0 mol % to 4 mol % CaO; greater than 0 mol % to 17.5 mol % MgO; 0.5 mol % to 8 mol % $Na_2O$; 0 mol % to 2.5 mol % $La_2O_3$; and greater than 8 mol % to 18 mol % $Li_2O$, wherein $(Li_2O+Na_2O+MgO)/Al_2O_3$ is from 0.9 to less than 1.3; and $Al_2O_3+MgO+Li_2O+ZrO_2+La_2O_3+Y_2O_3$ is from greater than 23 mol % to less than 50 mol %. The glass composition may be characterized by at least one of the following: a $K_{1C}$ value measured by a chevron short bar method of at least 0.75; and a $K_{1C}$ value measured by a double torsion method of at least 0.8. The glass composition is chemically strengthenable. The glass composition may be used in a glass article or a consumer electronic product.

37 Claims, 7 Drawing Sheets

(56) References Cited

U.S. PATENT DOCUMENTS

| | | | |
|---|---|---|---|
| 2016/0102014 A1 | 4/2016 | Hu et al. | |
| 2016/0185647 A1* | 6/2016 | Vogt | C03B 33/10 |
| | | | 428/43 |
| 2016/0347651 A1 | 12/2016 | Beall et al. | |
| 2016/0347655 A1 | 12/2016 | Meinhardt et al. | |
| 2016/0376186 A1 | 12/2016 | Gross | |
| 2017/0174557 A1 | 6/2017 | Gross et al. | |
| 2017/0183257 A1* | 6/2017 | Apitz | C03C 3/097 |
| 2017/0197869 A1 | 7/2017 | Beall et al. | |
| 2017/0215236 A1* | 7/2017 | Doerk | C03C 4/02 |
| 2017/0260086 A1* | 9/2017 | Plevacova | F24C 15/10 |
| 2017/0273201 A1* | 9/2017 | Eckart | C03C 21/002 |
| 2017/0305786 A1 | 10/2017 | Roussev et al. | |
| 2017/0341973 A1 | 11/2017 | Gross et al. | |
| 2018/0022635 A1 | 1/2018 | Luo et al. | |
| 2018/0127302 A1* | 5/2018 | Gross | C03C 3/083 |
| 2018/0127303 A1* | 5/2018 | Gross | H05K 5/03 |
| 2019/0084869 A1 | 3/2019 | Luo et al. | |

FOREIGN PATENT DOCUMENTS

| | | |
|---|---|---|
| CN | 105916824 A | 8/2016 |
| JP | 2001134925 A | 5/2001 |
| JP | 5744068 B2 | 7/2015 |
| WO | 2012126394 A1 | 9/2012 |
| WO | 2018085278 A2 | 5/2018 |

OTHER PUBLICATIONS

Eagan et al; "Effect of Composition on the Mechanical Properties of Aluminosilicate and Borosilicate Glasses"; J. Am. Ceram. Sos. 61, 27-30, (1978.

Fineberg et al; "Instability in Dynamic Fracture"; Phys. Rev. Lett. 67, 457-460, (1991).

Gopalakrishnan et al; "Quantitative Fractography of Mixed Mode Fracture in Glass and Ceramics"; J. Eur. Ceram. Soc. 34, 3247-3254, (2014).

Hill et al; "Stress Profile Characteristics and Mechanical Behaviour of Chemically Strengthened Lithium Magnesium Aluminosilicate"; Glass Technology, vol. 30, No. 4, (1989) pp. 123-127.

Johnson et al; "Microstructure of the Mist Zone on Glass Fracture Surfaces"; The Philosophical Magazine: A Journal of Theoretical Experimental and Applied Physics; 17:149 (1968); pp. 899-910.

Johnson et al; "On the Shape and Size of the Fracture Zones on Glass Fracture Surfaces"; The Philosophical Magazine: A Journal of Theoretical Experimental and Applied Physics; 14:130 (1966) pp. 731-743.

Kirchner et al; "Comparison of the Stress-Intensity and Jounson-and-Holloway Criteria for Crack Branching in Rectangular Bars"; J. Am. Ceram. Soc. 70, 565-569, (1987).

Lawn et al; "A Model for Crack Initiation in Elastic/Plastic Indentation Fields"; Journal of Materials Science 12, 2195-2199, (1977).

Marder et al. "Origin of Crack Tip Instabilities"; J. Mech. Phys. Solids 43, 1-48, (1995).

Mecholsky et al; "Prediction of Fracture Energy and Flaw Size in Glasses From Measurements of Mirror Size"; J. Am. Ceram. Soc. 57, 440-443, (1974).

Ravi-Chandar et al; "An Experimental Invesitgation Into Dynamic Fracture: III. On Steady-State Crack Propagation and Crack Branching"; International Journal of Fracture 26, 141-154, (1984).

Ravi-Chandar et al; "An Experimental Investigation Into Dynamic Fracture: II. Microstructural Aspects"; International Journal of Fracture 26, 65-80, (1984).

Reddy et al; "Fracture Toughness Measurement of Glass and Ceramic Materials Using Chevron-Notched Specimens"; J. Am. Ceram. Soc. 71 (6) C310-C313 (1988.

Rosales-Sosa et al; "Crack-Resistant $Al_2O_3$—$SiO_2$ Glasses"; Sci Rep 6, 23620, (2016).

Rosales-Sosa et al; "High Elastic Moduli of a $54Al_2O_3$—$46Ta_2O_5$ Glass Fabricated Via Containerless Processing"; Sci Rep 5, 15233 (2015).

Rouxel et al; "The Fracture Toughness of Inorganic Glasses"; J. Am. Ceram. Soc. 100, 43744396, (2017).

Shand; "Breaking Stress of Glass Determined From Dimensions of Fracture Mirrors"; J. Am. Ceram. Soc. 42, 474-477, (1959).

Shand; "Experimental Study of Fracture of Glass: I, The Fracture Process"; J. Am. Ceram. Soc. 37, 52-59, (1954).

Shand; "Experimental Study of Fracture of Glass: II, Experimental Data"; J. Am. Ceram. Soc. 37, 559-572, (1954).

Sharon et al; "Local Crack Branching as a Mechanism for Instability in Dynamic Fracture"; Phys. Rev. Lett. 74, 5096-5099, (1995).

Shi et al; "Intrinsic Ductility of Glassy Solids"; Journal of Applied Physics, 115, 043528 (2014.

Shinkai et al; "Crack-Branching OG Binary $PbO$—$B_2O_3$ Glasses"; J. Non-Cryst. Solids 52, 385-394, (1982).

Shyam et al; "The Double-Torsion Testing Technique for Determination of Fracture Toughness and Slow Crack Growth Behavior of Materials: A Review"; J. Mater Sci. 41; pp. 4093-4104 (2006.

Luo et al; "Structural Origin of Intrinsic Ductility in Binary Aluminosilicate Glasses"; J. Non-Cryst. Solids 452, 297-306.

Zhang et al; "A Novel Upconversion $TiO_2La_2O_3Ta_2O_5$ Bulk Glass Co-Doped With $Er^{3+}$/$Yb^{3+}$ Fabricated by Containerless Processing"; Materials Letters 66, 367-369 (2012.

International Search Report and Written Opinion PCT/US2019/024659 dated Jul. 5, 2019, 13 Pgs.

NL2020914 Search Report and Written Opinion dated Dec. 11, 2018, Netherlands Patent Office, 10 Pgs.

Chinese Patent Application No. 201980023275.8, Office Action, dated Apr. 25, 2022, 12 pages (5 pages of English Translation and 7 pages of Original Document), Chinese Patent Office.

* cited by examiner

GLASSES HAVING HIGH FRACTURE TOUGHNESS

CROSS-REFERENCE TO RELATED APPLICATIONS

This application claims the benefit of priority to Dutch Patent Application No. 2020914, filed on May 11, 2018, and claims the benefit of priority to U.S. Provisional Application Ser. No. 62/649,958 filed on Mar. 29, 2018, the contents of each are relied upon and incorporated herein by reference in their entirety.

BACKGROUND

Field

The present specification generally relates to glass compositions suitable for use as cover glass for electronic devices. More specifically, the present specification is directed to lithium containing aluminosilicate glasses that may be formed into cover glass for electronic devices.

Technical Background

The mobile nature of portable devices, such as smart phones, tablets, portable media players, personal computers, and cameras, makes these devices particularly vulnerable to accidental dropping on hard surfaces, such as the ground. These devices typically incorporate cover glasses, which may become damaged upon impact with hard surfaces. In many of these devices, the cover glasses function as display covers, and may incorporate touch functionality, such that use of the devices is negatively impacted when the cover glasses are damaged.

There are two major failure modes of cover glass when the associated portable device is dropped on a hard surface. One of the modes is flexure failure, which is caused by bending of the glass when the device is subjected to dynamic load from impact with the hard surface. The other mode is sharp contact failure, which is caused by introduction of damage to the glass surface. Impact of the glass with rough hard surfaces, such as asphalt, granite, etc., can result in sharp indentations in the glass surface. These indentations become failure sites in the glass surface from which cracks may develop and propagate.

Glass can be made more resistant to flexure failure by the ion-exchange technique, which involves inducing compressive stress in the glass surface. However, the ion-exchanged glass will still be vulnerable to dynamic sharp contact, owing to the high stress concentration caused by local indentations in the glass from the sharp contact.

It has been a continuous effort for glass makers and handheld device manufacturers to improve the resistance of handheld devices to sharp contact failure. Solutions range from coatings on the cover glass to bezels that prevent the cover glass from impacting the hard surface directly when the device drops on the hard surface. However, due to the constraints of aesthetic and functional requirements, it is very difficult to completely prevent the cover glass from impacting the hard surface.

It is also desirable that portable devices be as thin as possible. Accordingly, in addition to strength, it is also desired that glasses to be used as cover glass in portable devices be made as thin as possible. Thus, in addition to increasing the strength of the cover glass, it is also desirable for the glass to have mechanical characteristics that allow it to be formed by processes that are capable of making thin glass articles, such as thin glass sheets.

Accordingly, a need exists for glasses that can be strengthened, such as by ion exchange, and that have the mechanical properties that allow them to be formed as thin glass articles.

SUMMARY

According to an embodiment, a glass article is provided. The glass article comprises: 50 mol % to 69 mol % $SiO_2$; 12.5 mol % to 25 mol % $Al_2O_3$; 0 mol % to 8 mol % $B_2O_3$; greater than 0 mol % to 4 mol % CaO; greater than 0 mol % to 17.5 mol % MgO; 0.5 mol % to 8 mol % $Na_2O$; 0 mol % to 2.5 mol % $La_2O_3$; and greater than 8 mol % to 18 mol % $Li_2O$. The glass composition is characterized by ($Li_2O+Na_2O+MgO)/Al_2O_3$ from 0.9 to less than 1.3; and $Al_2O_3+MgO+Li_2O+ZrO_2+La_2O_3+Y_2O_3$ from greater than 23 mol % to less than 50 mol %.

According to an embodiment, a glass article is provided. The composition at a center of the glass article comprises: 50 mol % to 69 mol % $SiO_2$; 12.5 mol % to 25 mol % $Al_2O_3$; 0 mol % to 8 mol % $B_2O_3$; greater than 0 mol % to 4 mol % CaO; greater than 0 mol % to 17.5 mol % MgO; 0.5 mol % to 8 mol % $Na_2O$; 0 mol % to 2.5 mol % $La_2O_3$; and greater than 8 mol % to 18 mol % $Li_2O$, wherein: ($Li_2O+Na_2O+MgO)/Al_2O_3$ is from 0.9 to less than 1.3, and $Al_2O_3+MgO+Li_2O+ZrO_2+La_2O_3+Y_2O_3$ is from greater than 23 mol % to less than 50 mol %. The glass article comprises a compressive stress region extending from a surface of the glass article to a depth of compression.

According to an embodiment, a glass article is provided. The glass comprises: $SiO_2$; $Al_2O_3$; and $Li_2O$. The glass is characterized by at least one of the following: a $K_{1C}$ value measured by a chevron short bar method of at least 0.75; and a $K_{1C}$ value measured by a double torsion method of at least 0.8.

As aspect (1), a glass article is provided. The glass article, comprises: 50 mol % to 69 mol % $SiO_2$; 12.5 mol % to 25 mol % $Al_2O_3$; 0 mol % to 8 mol % $B_2O_3$; greater than 0 mol % to 4 mol % CaO; greater than 0 mol % to 17.5 mol % MgO; 0.5 mol % to 8 mol % $Na_2O$; 0 mol % to 2.5 mol % $La_2O_3$; and greater than 8 mol % to 18 mol % $Li_2O$; wherein: ($Li_2O+Na_2O+MgO)/Al_2O_3$ is from 0.9 to less than 1.3; and $Al_2O_3+MgO+Li_2O+ZrO_2+La_2O_3+Y_2O_3$ is from greater than 23 mol % to less than 50 mol %.

As aspect (2), the glass article of aspect (1) is provided, the glass article comprising greater than 8 mol % to 16 mol % $Li_2O$.

As aspect (3), the glass article of aspect (1) or (2) is provided, the glass article comprising 0 mol % to 2 mol % $TiO_2$.

As aspect (4), the glass article of any of aspects (1) to (3) is provided, the glass article comprising 0 mol % to 2.5 mol % $ZrO_2$.

As aspect (5), the glass article of any of aspects (1) to (4) is provided, the glass article comprising 0 mol % to 1 mol % SrO.

As aspect (6), the glass article of any of aspects (1) to (5) is provided, the glass article comprising 0 mol % to 2 mol % $Y_2O_3$.

As aspect (7), the glass article of any of aspects (1) to (6) is provided, the glass article further comprising $K_2O$.

As aspect (8), the glass article of any of aspects (1) to (7) is provided, the glass article wherein ($Li_2O+Na_2O+MgO)/Al_2O_3$ is from 0.9 to 1.0.

As aspect (9), the glass article of any of aspects (1) to (8) is provided, the glass article wherein $Al_2O_3+MgO+Li_2O+ZrO_2+La_2O_3+Y_2O_3$ is from 25 mol % to 46 mol %.

As aspect (10), the glass article of any of aspects (1) to (9) is provided, the glass article comprising greater than 0.5 mol % to 17.5 mol % MgO.

As aspect (11), the glass article of any of aspects (1) to (10) is provided, the glass article comprising greater than 0 mol % to 12 mol % MgO.

As aspect (12), the glass article of any of aspects (1) to (11) is provided, the glass article comprising 14 mol % to 24 mol % $Al_2O_3$.

As aspect (13), the glass article of any of aspects (1) to (12) is provided, the glass article wherein the glass article is substantially free of $P_2O_5$.

As aspect (14), the glass article of any of aspects (1) to (13) is provided, the glass article comprising 0.5 mol % to 8 mol % $B_2O_3$.

As aspect (15), the glass article of any of aspects (1) to (14) is provided, the glass article wherein the glass is fusion formable.

As aspect (16), the glass article of any of aspects (1) to (15) is provided, wherein the glass article is characterized by at least one of the following: a $K_{1C}$ value measured by a chevron short bar method of at least 0.75; and a $K_{1C}$ value measured by a double torsion method of at least 0.8.

As aspect (17), the glass article of any of aspects (1) to (16) is provided, wherein $5.631+0.148 \cdot Al_2O_3+0.142 \cdot B_2O_3-0.062 \cdot CaO-0.188 \cdot K_2O+0.030 \cdot MgO-0.099 \cdot Na_2O-0.043 \cdot Li_2O-0.188 \cdot P_2O_5+0.020 \cdot ZnO-0.062 \cdot SrO+0.200 \cdot ZrO_2 \geq 6.5$, wherein the value of each component is in mol %.

As aspect (18) a glass article is provided. The glass article comprises: a composition at a center of the glass article comprising: 50 mol % to 69 mol % $SiO_2$; 12.5 mol % to 25 mol % $Al_2O_3$; 0 mol % to 8 mol % $B_2O_3$; greater than 0 mol % to 4 mol % CaO; greater than 0 mol % to 17.5 mol % MgO; 0.5 mol % to 8 mol % $Na_2O$; 0 mol % to 2.5 mol % $La_2O_3$; and greater than 8 mol % to 18 mol % $Li_2O$; wherein: $(Li_2O+Na_2O+MgO)/Al_2O_3$ is from 0.9 to less than 1.3; $Al_2O_3+MgO+Li_2O+ZrO_2+La_2O_3+Y_2O_3$ is from greater than 23 mol % to less than 50 mol %, a compressive stress region extending from a surface of the glass article to a depth of compression.

As aspect (19), the glass article of aspect (18) is provided, wherein the glass article comprises a compressive stress of at least 400 MPa.

As aspect (20), the glass article of aspect (18) or (19) is provided, wherein the depth of compression is at least 20% of a thickness of the glass article.

As aspect (21), the glass article of any one of aspects (18) to (20) is provided, wherein the glass article comprises a maximum central tension of less than 85 MPa.

As aspect (22), a glass article is provided. The glass article comprises: $SiO_2$; $Al_2O_3$; and $Li_2O$, wherein the glass is characterized by at least one of the following: a $K_{1C}$ value measured by a chevron short bar method of at least 0.75; and a $K_{1C}$ value measured by a double torsion method of at least 0.8.

As aspect (23), the glass article of aspect (22) is provided, further comprising MgO.

As aspect (24), the glass article of aspect (22) or (23) is provided, further comprising CaO.

As aspect (25), the glass article of any one of aspects (22) to (24) is provided, further comprising $TiO_2$.

As aspect (26), the glass article of any one of aspects (22) to (25) is provided, further comprising $ZrO_2$.

As aspect (27), the glass article of any one of aspects (22) to (26) is provided, further comprising SrO.

As aspect (28), the glass article of any one of aspects (22) to (27) is provided, further comprising $Y_2O_3$.

As aspect (29), the glass article of any one of aspects (22) to (28) is provided, further comprising $K_2O$.

As aspect (30), the glass article of any one of aspects (22) to (29) is provided, further comprising $Na_2O$.

As aspect (31), the glass article of any one of aspects (22) to (30) is provided, wherein $(Li_2O+Na_2O+MgO)/Al_2O_3$ is from 0.9 to less than 1.3.

As aspect (32), the glass article of any one of aspects (22) to (31) is provided, wherein $Al_2O_3+MgO+Li_2O+ZrO_2+La_2O_3+Y_2O_3$ is from greater than 23 mol % to less than 50 mol %.

As aspect (33), the glass article of any one of aspects (22) to (32) is provided, further comprising $B_2O_3$.

As aspect (34), the glass article of any one of aspects (22) to (33) is provided, wherein the glass is fusion formable.

As aspect (35), the glass article of any one of aspects (22) to (33) is provided, wherein $5.631+0.148 \cdot Al_2O_3+0.142 \cdot B_2O_3-0.062 \cdot CaO-0.188 \cdot K_2O+0.030 \cdot MgO-0.099 \cdot Na_2O-0.043 \cdot Li_2O-0.188 \cdot P_2O_5+0.020 \cdot ZnO-0.062 \cdot SrO+0.200 \cdot ZrO_2 \geq 6.5$, wherein the value of each component is in mol %.

As aspect (36), a consumer electronic product is provided. The consumer electronic product comprises: a housing having a front surface, a back surface and side surfaces; electrical components provided at least partially within the housing, the electrical components including at least a controller, a memory, and a display, the display being provided at or adjacent the front surface of the housing; and a cover glass disposed over the display, wherein at least one of a portion of the housing or a portion of the cover glass comprises the glass article of any preceding claim.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
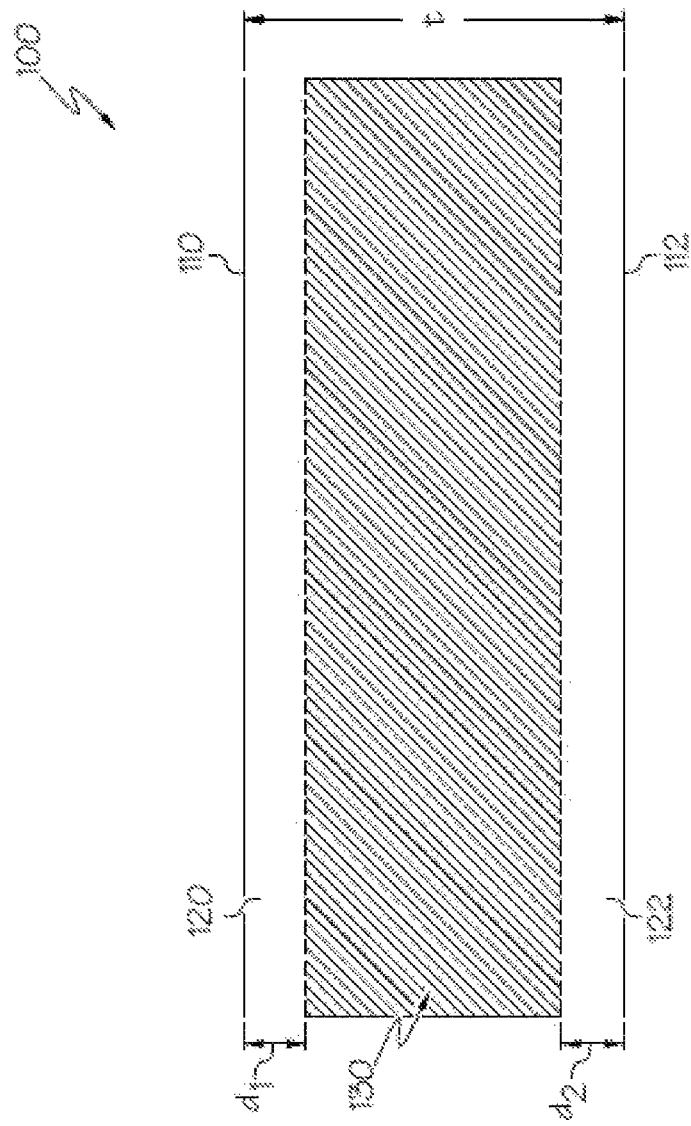
FIG. 1 schematically depicts a cross section of a glass having compressive stress layers on surfaces thereof according to embodiments disclosed and described herein.

Reference will now be made in detail to alkali aluminosilicate glasses according to various embodiments. Alkali aluminosilicate glasses have good ion exchangeability, and chemical strengthening processes have been used to achieve high strength and high toughness properties in alkali aluminosilicate glasses. Sodium aluminosilicate glasses are highly ion exchangeable glasses with high glass formability and quality. Lithium aluminosilicate glasses are highly ion exchangeable glasses with high glass quality. The substitution of $Al_2O_3$ into the silicate glass network increases the interdiffusivity of monovalent cations during ion exchange. By chemical strengthening in a molten salt bath (e.g., $KNO_3$ or $NaNO_3$), glasses with high strength, high toughness, and high indentation cracking resistance can be achieved. The stress profiles achieved through chemical strengthening may have a variety of shapes that increase the drop performance, strength, toughness, and other attributes of the glass articles.

Therefore, alkali aluminosilicate glasses with good physical properties, chemical durability, and ion exchangeability have drawn attention for use as cover glass. In particular, lithium containing aluminosilicate glasses, which have higher fracture toughness and fast ion exchangeability, are provided herein. Through different ion exchange processes, greater central tension (CT), depth of compression (DOC), and high compressive stress (CS) can be achieved. However, the addition of lithium in the alkali aluminosilicate glass may reduce the melting point, softening point, or liquidus viscosity of the glass.

Drawing processes for forming glass articles, such as, for example, glass sheets, are desirable because they allow a thin glass article to be formed with few defects. It was previously thought that glass compositions were required to have relatively high liquidus viscosities—such as a liquidus viscosity greater than 1000 kP, greater than 1100 kP, or greater than 1200 kP—to be formed by a drawing process, such as, for example, fusion drawing or slot drawing. However, developments in drawing processes may allow glasses with lower liquidus viscosities to be used in drawing processes.

In embodiments of glass compositions described herein, the concentration of constituent components (e.g., $SiO_2$, $Al_2O_3$, $Li_2O$, and the like) are given in mole percent (mol %) on an oxide basis, unless otherwise specified. Components of the alkali aluminosilicate glass composition according to embodiments are discussed individually below. It should be understood that any of the variously recited ranges of one component may be individually combined with any of the variously recited ranges for any other component. As used herein, a trailing 0 in a number is intended to represent a significant digit for that number. For example, the number "1.0" includes two significant digits, and the number "1.00" includes three significant digits.

Disclosed herein are lithium aluminosilicate glass compositions that exhibit a high fracture toughness ($K_{1C}$) while also exhibiting a degree of manufacturability that enables efficient production of glass articles having the compositions. In some embodiments, the lithium aluminosilicate glass compositions are characterized by at least one of a $K_{1C}$ fracture toughness value measured by a chevron short bar method of at least 0.75 and a $K_{1C}$ fracture toughness value measured by a double torsion method of at least 0.8. Without wishing to be bound by any particular theory, it is believed that the high fracture toughness of the lithium aluminosilicate glasses described herein is due at least in part to the concentration of the high field strength components contained in the glass composition.

In embodiments of the alkali aluminosilicate glass compositions disclosed herein, $SiO_2$ is the largest constituent and, as such, $SiO_2$ is the primary constituent of the glass network formed from the glass composition. Pure $SiO_2$ has a relatively low CTE and is alkali free. However, pure $SiO_2$ has a high melting point. Accordingly, if the concentration of $SiO_2$ in the glass composition is too high, the formability of the glass composition may be diminished as higher concentrations of $SiO_2$ increase the difficulty of melting the glass, which, in turn, adversely impacts the formability of the glass. In embodiments, the glass composition generally comprises $SiO_2$ in an amount from greater than or equal to 50.0 mol % to less than or equal to 69.0 mol %, and all ranges and sub-ranges between the foregoing values. In some embodiments, the glass composition comprises $SiO_2$ in amounts greater than or equal to 51.0 mol %, such as greater than or equal to 52.0 mol %, greater than or equal to 53.0 mol %, greater than or equal to 54.0 mol %, greater than or equal to 55.0 mol %, greater than or equal to 56.0 mol %, greater than or equal to 57.0 mol %, greater than or equal to 58.0 mol %, greater than or equal to 59.0 mol %, greater than or equal to 60.0 mol %, greater than or equal to 61.0 mol %, greater than or equal to 62.0 mol %, greater than or equal to 63.0 mol %, greater than or equal to 64.0 mol %, greater than or equal to 65.0 mol %, greater than or equal to 66.0 mol %, greater than or equal to 67.0 mol %, or greater than or equal to 68.0 mol %. In some embodiments, the glass composition comprises $SiO_2$ in amounts less than or equal to 68.0 mol %, such as less than or equal to 67.0 mol %, less than or equal to 66.0 mol %, less than or equal to 65.0 mol %, less than or equal to 64.0 mol %, less than or equal to 63.0 mol %, less than or equal to 62.0 mol %, less than or equal to 61.0 mol %, less than or equal to 60.0 mol %, less than or equal to 59.0 mol %, less than or equal to 58.0 mol %, less than or equal to 57.0 mol %, less than or equal to 56.0 mol %, less than or equal to 55.0 mol %, less than or equal to 54.0 mol %, less than or equal to 53.0 mol %, less than or equal to 52.0 mol %, or less than or equal to 51.0 mol %. It should be understood that, in embodiments, any of the above ranges may be combined with any other range. However, in other embodiments, the glass composition comprises $SiO_2$ in an amount from greater than or equal to 51.0 mol % to less than or equal to 68.0 mol %, such as from greater than or equal to 52.0 mol % to less than or equal to 67.0 mol %, from greater than or equal to 53.0 mol % to less than or equal to 66.0 mol %, from greater than or equal to 54.0 mol % to less than or equal to 65.0 mol %, from greater than or equal to 55.0 mol % to less than or equal to 64.0 mol %, from greater than or equal to 56.0 mol % to less than or equal to 63.0 mol %, from greater than or equal to 57.0 mol % to less than or equal to 62.0 mol %, from greater than or equal to 58.0 mol % to less than or equal to 61.0 mol %, or from greater than or equal to 60.0 mol % to less than or equal to 61.0 mol %, and all ranges and sub-ranges between the foregoing values.

The glass composition of embodiments may further comprise $Al_2O_3$. $Al_2O_3$ may serve as a glass network former, similar to $SiO_2$. $Al_2O_3$ may increase the viscosity of the glass composition due to its tetrahedral coordination in a glass melt formed from a glass composition, decreasing the formability of the glass composition when the amount of $Al_2O_3$ is too high. However, when the concentration of $Al_2O_3$ is balanced against the concentration of $SiO_2$ and the concentration of alkali oxides in the glass composition, $Al_2O_3$ can reduce the liquidus temperature of the glass melt, thereby enhancing the liquidus viscosity and improving the compatibility of the glass composition with certain forming processes, such as the fusion forming process. In embodiments, the glass composition generally comprises $Al_2O_3$ in a concentration of from greater than or equal to 12.5 mol % to less than or equal to 25.0 mol %, and all ranges and sub-ranges between the foregoing values. In some embodiments, the glass composition comprises $Al_2O_3$ in amounts greater than or equal to 13.0 mol %, such as greater than or equal to 13.5 mol %, greater than or equal to 14.0 mol %, greater than or equal to 14.5 mol %, greater than or equal to 15.0 mol %, greater than or equal to 15.5 mol %, greater than or equal to 16.0 mol %, greater than or equal to 16.5 mol %, greater than or equal to 17.0 mol %, greater than or equal to 17.5 mol %, greater than or equal to 18.0 mol %, greater than or equal to 18.5 mol %, greater than or equal to 19.0 mol %, greater than or equal to 19.5 mol %, greater than or equal to 20.0 mol %, greater than or equal to 20.5 mol %, greater than or equal to 21.0 mol %, greater than or equal to 21.5 mol %, greater than or equal to 22.0 mol %, greater than or equal to 22.5 mol %, greater than or equal to 23.0 mol %, greater than or equal to 23.5 mol %, greater than or equal to 24.0 mol %, or greater than or equal to 24.5 mol %. In embodiments, the glass composition comprises $Al_2O_3$ in amounts less than or equal to 24.5 mol %, such as less than or equal to 24.0 mol %, less than or equal to 23.5 mol %, less than or equal to 23.0 mol %, less than or equal to 22.5 mol %, less than or equal to 22.0 mol %, less than or equal to 21.5 mol %, less than or equal to 21.0 mol %, less than or equal to 20.5 mol %, less than or equal to 20.0 mol %, less than or equal to 19.5 mol %, less than or equal to 19.0 mol %, less than or equal to 18.5 mol %, less than or equal to 18.0 mol %, less than or equal to 17.5 mol %, less than or equal to 17.0 mol %, less than or equal to 16.5 mol %, less than or equal to 16.0 mol %, less than or equal to 15.5 mol %, less than or equal to 15.0 mol %, less than or equal to 14.5 mol %, less than or equal to 14.0 mol %, less than or equal to 13.5 mol %, or less than or equal to 13.0 mol %. It should be understood that, in embodiments, any of the above ranges may be combined with any other range. However, in other embodiments, the glass composition comprises $Al_2O_3$ in an amount from greater than or equal to 13.0 mol % to less than or equal to 24.5 mol %, such as from greater than or equal to 13.5 mol % to less than or equal to 24.0 mol %, from greater than or equal to 14.0 mol % to less than or equal to 23.5 mol %, from greater than or equal to 14.5 mol % to less than or equal to 23.0 mol %, from greater than or equal to 15.0 mol % to less than or equal to 22.5 mol %, from greater than or equal to 15.5 mol % to less than or equal to 22.0 mol %, from greater than or equal to 16.0 mol % to less than or equal to 21.5 mol %, from greater than or equal to 16.5 mol % to less than or equal to 21.0 mol %, from greater than or equal to 17.0 mol % to less than or equal to 20.5 mol %, from greater than or equal to 17.5 mol % to less than or equal to 20.0 mol %, from greater than or equal to 18.0 mol % to less than or equal to 19.5 mol %, or from greater than or equal to 18.5 mol % to less than or equal to 19.0 mol %, and all ranges and sub-ranges between the foregoing values. In some embodiments, the glass composition comprises $Al_2O_3$ in an amount from greater than or equal to 14.0 mol % to less than or equal to 24.0 mol %.

Like $SiO_2$ and $Al_2O_3$, $B_2O_3$ may be added to the glass composition as a network former, thereby reducing the meltability and formability of the glass composition. Thus, $B_2O_3$ may be added in amounts that do not overly decrease these properties. In embodiments, the glass composition may comprise $B_2O_3$ in amounts from greater than or equal to 0 mol % $B_2O_3$ to less than or equal to 8.0 mol % $B_2O_3$, and all ranges and sub-ranges between the foregoing values. In some embodiments, the glass composition may comprise $B_2O_3$ in amounts greater than or equal to 0.5 mol %, such as greater than or equal to 1.0 mol %, greater than or equal to 1.5 mol %, greater than or equal to 2.0 mol %, greater than or equal to 2.5 mol %, greater than or equal to 3.0 mol %, greater than or equal to 3.5 mol %, greater than or equal to 4.0 mol %, greater than or equal to 4.5 mol %, greater than or equal to 5.0 mol %, greater than or equal to 5.5 mol %, greater than or equal to 6.0 mol %, greater than or equal to 6.5 mol %, greater than or equal to 7.0 mol %, or greater than or equal to 7.5 mol %. In embodiments, the glass composition may comprise $B_2O_3$ in an amount less than or equal to 7.5 mol %, such as less than or equal to 7.0 mol %, less than or equal to 6.5 mol %, less than or equal to 6.0 mol %, less than or equal to 5.5 mol %, less than or equal to 5.0 mol %, less than or equal to 4.5 mol %, less than or equal to 4.0 mol %, less than or equal to 3.5 mol %, less than or equal to 3.0 mol %, less than or equal to 2.5 mol %, less than or equal to 2.0 mol %, less than or equal to 1.5 mol %, less than or equal to 1.0 mol %, or less than or equal to 0.5 mol %. It should be understood that, in embodiments, any of the above ranges may be combined with any other range. However, in yet other embodiments, the glass composition comprises $B_2O_3$ in amounts from greater than or equal to 0.5 mol % to less than or equal to 7.5 mol %, such as greater than or equal to 1.0 mol % to less than or equal to 7.0 mol %, greater than or equal to 1.5 mol % to less than or equal to 6.5 mol %, greater than or equal to 2.0 mol % to less than or equal to 6.0 mol %, greater than or equal to 2.5 mol % to less than or equal to 5.5 mol %, greater than or equal to 3.0 mol % to less than or equal to 5.0 mol %, greater than or equal to 3.5 mol % to less than or equal to 4.5 mol %, or greater than or equal to 5.0 mol % to less than or equal to 7.0 mol %, and all ranges and sub-ranges between the foregoing values.

The inclusion of $Li_2O$ in the glass composition allows for better control of an ion exchange process and further reduces the softening point of the glass, thereby increasing the manufacturability of the glass. In embodiments, the glass composition generally comprises $Li_2O$ in an amount from greater than 8.0 mol % to less than or equal to 18.0 mol %, and all ranges and sub-ranges between the foregoing values. In some embodiments, the glass composition comprises $Li_2O$ in amounts greater than or equal to 8.5 mol %, such as greater than or equal to 8.0 mol %, greater than or equal to 8.5 mol %, greater than or equal to 9.0 mol %, greater than or equal to 9.5 mol %, greater than or equal to 10.0 mol %, greater than or equal to 10.5 mol %, greater than or equal to 11.0 mol %, greater than or equal to 11.5 mol %, greater than or equal to 12.0 mol %, greater than or equal to 12.5 mol %, greater than or equal to 13.0 mol %, greater than or equal to 13.5 mol %, greater than or equal to 14.0 mol %, greater than or equal to 14.5 mol %, greater than or equal to 15.0 mol %, greater than or equal to 15.5 mol %, greater than or equal to 16.0 mol %, greater than or equal to 16.5 mol %, greater than or equal to 17.0 mol %, or greater than or equal to 17.5 mol %. In some embodiments, the glass composition comprises $Li_2O$ in amounts less than or equal to 17.5 mol %, such as less than or equal to 17.0 mol %, less than or equal to 16.5 mol %, less than or equal to 16.0 mol %, less than or equal to 15.5 mol %, less than or equal to 15.0 mol %, less than or equal to 14.5 mol %, less than or equal to 14.0 mol %, less than or equal to 13.5 mol %, less than or equal to 13.0 mol %, less than or equal to 12.5 mol %, less than or equal to 12.0 mol %, less than or equal to 11.5 mol %, less than or equal to 11.0 mol %, less than or equal to 10.5 mol %, less than or equal to 10.0 mol %, less than or equal to 9.5 mol %, less than or equal to 9.0 mol %, or less than or equal to 8.5 mol %. It should be understood that, in embodiments, any of the above ranges may be combined with any other range. However, in yet other embodiments, the glass composition comprises $Li_2O$ in an amount from greater than or equal to 8.5 mol % to less than or equal to 17.5 mol %, such as from greater than or equal to 9.0 mol % to less than or equal to 17.0 mol %, from greater than or equal to 9.5 mol % to less than or equal to 16.5 mol %, from greater than or equal to 10.0 mol % to less than or equal to 16.0 mol %, from greater than or equal to 10.5 mol % to less than or equal to 15.5 mol %, from greater than or equal to 11.0 mol % to less than or equal to 15.0 mol %, from greater than or equal to 11.5 mol % to less than or equal to 14.5 mol %, from greater than or equal to 12.0 mol % to less than or equal to 14.0 mol %, or from greater than or equal to 12.5 mol % to less than or equal to 13.5 mol %, and all ranges and sub-ranges between the foregoing values. In some embodiments, the glass composition comprises $Li_2O$ in an amount from greater than 8.0 mol % to less than or equal to 16.0 mol %.

According to embodiments, the glass composition may also comprise alkali metal oxides other than $Li_2O$, such as $Na_2O$. $Na_2O$ aids in the ion exchangeability of the glass composition, and also improves the formability, and thereby manufacturability, of the glass composition. However, if too much $Na_2O$ is added to the glass composition, the CTE may be too low, and the melting point may be too high. In embodiments, the glass composition generally comprises $Na_2O$ in an amount from greater than or equal to 0.5 mol % $Na_2O$ to less than or equal to 8.0 mol % $Na_2O$, and all ranges and sub-ranges between the foregoing values. In some embodiments, the glass composition comprises $Na_2O$ in amounts greater than or equal to 1.0 mol %, such as greater than or equal to 1.5 mol %, greater than or equal to 2.0 mol %, greater than or equal to 2.5 mol %, greater than or equal to 3.0 mol %, greater than or equal to 3.5 mol %, greater than or equal to 4.0 mol %, greater than or equal to 4.5 mol %, greater than or equal to 5.0 mol %, greater than or equal to 5.5 mol %, greater than or equal to 6.0 mol %, greater than or equal to 6.5 mol %, greater than or equal to 7.0 mol %, or greater than or equal to 7.5 mol %. In some embodiments, the glass composition comprises $Na_2O$ in amounts less than or equal to 7.5 mol %, such as less than or equal to 7.0 mol %, less than or equal to 6.5 mol %, less than or equal to 6.0 mol %, less than or equal to 5.5 mol %, less than or equal to 5.0 mol %, or less than or equal to 4.5 mol %, less than or equal to 4.0 mol %, less than or equal to 3.5 mol %, less than or equal to 3.0 mol %, less than or equal to 2.5 mol %, less than or equal to 2.0 mol %, less than or equal to 1.5 mol %, or less than or equal to 1.0 mol %. It should be understood that, in embodiments, any of the above ranges may be combined with any other range. However, in yet other embodiments, the glass composition comprises $Na_2O$ in an amount from greater than or equal to 1.0 mol % to less than or equal to 7.5 mol %, such as from greater than or equal to 1.5 mol % to less than or equal to 7.0 mol %, from greater than or equal to 2.0 mol % to less than or equal to 6.5 mol %, from greater than or equal to 2.5 mol % to less than or equal to 6.0 mol %, from greater than or equal to 3.0 mol % to less than or equal to 5.5 mol %, from greater than or equal to 3.5 mol % to less than or equal to 5.0 mol %, or from greater than or equal to 4.0 mol % to less than or equal to 4.5 mol %, and all ranges and sub-ranges between the foregoing values.

Like $Na_2O$, $K_2O$ also promotes ion exchange and increases the DOC of a compressive stress layer. However, adding $K_2O$ may cause the CTE may be too low, and the melting point may be too high. In some embodiment, the glass composition can include $K_2O$. In embodiments, the glass composition is substantially free of potassium. As used herein, the term "substantially free" means that the component is not added as a component of the batch material even though the component may be present in the final glass in very small amounts as a contaminant, such as less than 0.01 mol %. In other embodiments, $K_2O$ may be present in the glass composition in amounts less than 1 mol %.

MgO lowers the viscosity of a glass, which enhances the formability and manufacturability of the glass. The inclusion if MgO in the glass composition also improves the strain point and the Young's modulus of the glass composition, and may also improve the ion exchange ability of the glass. However, when too much MgO is added to the glass composition, the density and the CTE of the glass composition increase undesirably. In embodiments, the glass composition generally comprises MgO in a concentration of from greater than 0 mol % to less than or equal to 17.5 mol %, and all ranges and sub-ranges between the foregoing values. In some embodiments, the glass composition comprises MgO in amounts greater than or equal to 0.5 mol %, such as greater than or equal to 1.0 mol %, greater than or equal to 1.5 mol %, greater than or equal to 2.0 mol %, greater than or equal to 2.5 mol %, greater than or equal to 3.0 mol %, greater than or equal to 3.5 mol %, greater than or equal to 4.0 mol %, greater than or equal to 4.5 mol %, greater than or equal to 5.0 mol %, greater than or equal to 5.5 mol %, greater than or equal to 6.0 mol %, greater than or equal to 6.5 mol %, greater than or equal to 7.0 mol %, greater than or equal to 7.5 mol %, greater than or equal to 8.0 mol %, greater than or equal to 8.5 mol %, greater than or equal to 9.0 mol %, greater than or equal to 9.5 mol %, greater than or equal to 10.0 mol %, greater than or equal to 10.5 mol %, greater than or equal to 11.0 mol %, greater than or equal to 11.5 mol %, greater than or equal to 12.0 mol %, greater than or equal to 12.5 mol %, greater than or equal to 13.0 mol %, greater than or equal to 13.5 mol %, greater than or equal to 14.0 mol %, greater than or equal to 14.5 mol %, greater than or equal to 15.0 mol %, greater than or equal to 15.5 mol %, greater than or equal to 16.0 mol %, greater than or equal to 16.5 mol %, or greater than or equal to 17.0 mol %. In some embodiments, the glass composition comprises MgO in amounts less than or equal to 17.0 mol %, such as less than or equal to 16.5 mol %, less than or equal to 16.0 mol %, less than or equal to 15.5 mol %, less than or equal to 15.0 mol %, less than or equal to 14.5 mol %, less than or equal to 14.0 mol %, less than or equal to 13.5 mol %, less than or equal to 13.0 mol %, less than or equal to 12.5 mol %, less than or equal to 12.0 mol %, less than or equal to 11.5 mol %, less than or equal to 11.0 mol %, less than or equal to 10.5 mol %, less than or equal to 10.0 mol %, less than or equal to 9.5 mol %, less than or equal to 9.0 mol %, less than or equal to 8.5 mol %, less than or equal to 8.0 mol %, less than or equal to 7.5 mol %, less than or equal to 7.0 mol %, less than or equal to 6.5 mol %, less than or equal to 6.0 mol %, less than or equal to 5.5 mol %, less than or equal to 5.0 mol %, less than or equal to 4.5 mol %, less than or equal to 4.0 mol %, less than or equal to 3.5 mol %, less than or equal to 3.0 mol %, less than or equal to 2.5 mol %, less than or equal to 2.0 mol %, less than or equal to 1.5 mol %, less than or equal to 1.0 mol %, or less than or equal to 0.5 mol %. It should be understood that, in embodiments, any of the above ranges may be combined with any other range. However, in other embodiments, the glass composition comprises MgO in an amount from greater than or equal to 0.5 mol % to less than or equal to 17.0 mol %, such as from greater than or equal to 1.0 mol % to less than or equal to 16.5 mol %, from greater than or equal to 1.5 mol % to less than or equal to 16.0 mol %, from greater than or equal to 2.0 mol % to less than or equal to 15.5 mol %, from greater than or equal to 2.5 mol % to less than or equal to 15.0 mol %, from greater than or equal to 3.0 mol % to less than or equal to 14.5 mol %, from greater than or equal to 3.5 mol % to less than or equal to 14.0 mol %, from greater than or equal to 4.0 mol % to less than or equal to 13.5 mol %, from greater than or equal to 4.5 mol % to less than or equal to 13.0 mol %, from greater than or equal to 5.0 mol % to less than or equal to 12.5 mol %, from greater than or equal to 5.5 mol % to less than or equal to 12.0 mol %, from greater than or equal to 6.0 mol % to less than or equal to 11.5 mol %, from greater than or equal to 6.5 mol % to less than or equal to 11.0 mol %, from greater than or equal to 7.0 mol % to less than or equal to 10.5 mol %, from greater than or equal to 7.5 mol % to less than or equal to 10.0 mol %, from greater than or equal to 8.0 mol % to less than or equal to 9.5 mol %, or from greater than or equal to 8.5 mol % to less than or equal to 9.0 mol %, and all ranges and sub-ranges between the foregoing values. In some embodiments, the glass composition comprises MgO in an amount from greater than 0.5 mol % to less than or equal to 17.5 mol %, or from greater than 0 mol % to less than or equal to 12.0 mol %.

CaO lowers the viscosity of a glass, which enhances the formability, the strain point and the Young's modulus, and may improve the ion exchange ability. However, when too much CaO is added to the glass composition, the density and the CTE of the glass composition increase. In embodiments, the glass composition generally comprises CaO in a concentration of from greater than 0 mol % to less than or equal to 4.0 mol %, and all ranges and sub-ranges between the foregoing values. In some embodiments, the glass composition comprises CaO in amounts greater than or equal to 0.5 mol %, such as greater than or equal to 1.0 mol %, greater than or equal to 1.5 mol %, greater than or equal to 2.0 mol %, greater than or equal to 2.5 mol %, greater than or equal to 3.0 mol %, or greater than or equal to 3.5 mol %. In some embodiments, the glass composition comprises CaO in amounts less than or equal to 3.5 mol %, such as less than or equal to 3.0 mol %, less than or equal to 2.5 mol %, less than or equal to 2.0 mol %, less than or equal to 1.5 mol %, less than or equal to 1.0 mol %, or less than or equal to 0.5 mol %. It should be understood that, in embodiments, any of the above ranges may be combined with any other range. However, in other embodiments, the glass composition comprises CaO in an amount from greater than or equal to 0.5 mol % to less than or equal to 3.5 mol %, such as from greater than or equal to 1.0 mol % to less than or equal to 3.0 mol %, or from greater than or equal to 1.5 mol % to less than or equal to 2.5 mol %, and all ranges and sub-ranges between the foregoing values.

$La_2O_3$ increases the toughness of the glass, and also increases the Young's modulus and hardness of the glass. However, when too much $La_2O_3$ is added to the glass composition, the glass becomes susceptible to devitrification and the manufacturability of the glass is decreased. In embodiments, the glass composition generally comprises $La_2O_3$ in a concentration of from greater than or equal to 0 mol % to less than or equal to 2.5 mol %, and all ranges and sub-ranges between the foregoing values. In some embodiments, the glass composition comprises $La_2O_3$ in amounts greater than or equal to 0.5 mol %, such as greater than or equal to 1.0 mol %, greater than or equal to 1.5 mol %, or greater than or equal to 2.0 mol %. In some embodiments, the glass composition comprises $La_2O_3$ in amounts less than or equal to 2.0 mol %, such as less than or equal to 1.5 mol %, less than or equal to 1.0 mol %, or less than or equal to 0.5 mol %. It should be understood that, in embodiments, any of the above ranges may be combined with any other range. However, in other embodiments, the glass composition comprises $La_2O_3$ in an amount from greater than or equal to 0.5 mol % to less than or equal to 2.0 mol %, such as from greater than or equal to 1.0 mol % to less than or equal to 1.5 mol %, and all ranges and sub-ranges between the foregoing values. In some embodiments, the glass composition is free or substantially free of $La_2O_3$.

$Y_2O_3$ also increases the toughness of the glass, and increases the Young's modulus and hardness of the glass. However, when too much $Y_2O_3$ is added to the glass composition, the glass becomes susceptible to devitrification and the manufacturability of the glass is decreased. In embodiments, the glass composition comprises $Y_2O_3$, such as in a concentration of from greater than or equal to 0 mol % to less than or equal to 2.0 mol %, and all ranges and sub-ranges between the foregoing values. In some embodiments, the glass composition comprises $Y_2O_3$ in amounts greater than or equal to 0.5 mol %, such as greater than or equal to 1.0 mol %, or greater than or equal to 1.5 mol %. In some embodiments, the glass composition comprises $Y_2O_3$ in amounts less than or equal to 1.5 mol %, such as less than or equal to 1.0 mol %, or less than or equal to 0.5 mol %. It should be understood that, in embodiments, any of the above ranges may be combined with any other range. However, in other embodiments, the glass composition comprises $Y_2O_3$ in an amount from greater than or equal to 0.5 mol % to less than or equal to 1.5 mol %. In some embodiments, the glass composition is free or substantially free of $Y_2O_3$.

$TiO_2$ also contributes to the increased toughness of the glass, while also simultaneously softening the glass. However, when too much $TiO_2$ is added to the glass composition, the glass becomes susceptible to devitrification and exhibits an undesirable coloration. In embodiments, the glass composition comprises $TiO_2$, such as in a concentration of from greater than or equal to 0 mol % to less than or equal to 2.0 mol %, and all ranges and sub-ranges between the foregoing values. In some embodiments, the glass composition comprises $TiO_2$ in amounts greater than or equal to 0.5 mol %, such as greater than or equal to 1.0 mol %, or greater than or equal to 1.5 mol %. In some embodiments, the glass composition comprises $TiO_2$ in amounts less than or equal to 1.5 mol %, such as less than or equal to 1.0 mol %, or less than or equal to 0.5 mol %. It should be understood that, in embodiments, any of the above ranges may be combined with any other range. However, in other embodiments, the glass composition comprises $TiO_2$ in an amount from greater than or equal to 0.5 mol % to less than or equal to 1.5 mol %. In some embodiments, the glass composition is free or substantially free of $TiO_2$.

ZrO$_2$ contributes to the toughness of the glass. However, when too much ZrO$_2$ is added to the glass composition, undesirable zirconia inclusions may be formed in the glass due at least in part to the low solubility of ZrO$_2$ in the glass. In embodiments, the glass composition comprises ZrO$_2$, such as in a concentration of from greater than or equal to 0 mol % to less than or equal to 2.5 mol %, and all ranges and sub-ranges between the foregoing values. In some embodiments, the glass composition comprises ZrO$_2$ in amounts greater than or equal to 0.5 mol %, such as greater than or equal to 1.0 mol %, greater than or equal to 1.5 mol %, or greater than or equal to 2.0 mol %. In some embodiments, the glass composition comprises La$_2$O$_3$ in amounts less than or equal to 2.0 mol %, such as less than or equal to 1.5 mol %, less than or equal to 1.0 mol %, or less than or equal to 0.5 mol %. It should be understood that, in embodiments, any of the above ranges may be combined with any other range. However, in other embodiments, the glass composition comprises ZrO$_2$ in an amount from greater than or equal to 0.5 mol % to less than or equal to 2.0 mol %, such as from greater than or equal to 1.0 mol % to less than or equal to 1.5 mol %, and all ranges and sub-ranges between the foregoing values. In some embodiments, the glass composition is free or substantially free of ZrO$_2$.

SrO lowers the liquidus temperature of glass compositions disclosed herein. In embodiments, the glass composition may comprise SrO in amounts from greater than or equal to 0 mol % to less than or equal to 1.0 mol %, such as from greater than or equal to 0.2 mol % to less than or equal to 0.8 mol %, or from greater than or equal to 0.4 mol % to less than or equal to 0.6 mol %, and all ranges and sub-ranges between the foregoing values. In some embodiments, the glass composition may comprise SrO in amounts greater than or equal to 0.2 mol %, such as greater than or equal to 0.4 mol %, greater than or equal to 0.6 mol %, or greater than or equal to 0.8 mol %. In some embodiments, the glass composition may comprise SrO in amounts less than or equal to 0.8 mol %, such as less than or equal to 0.6 mol %, less than or equal to 0.4 mol %, or less than or equal to 0.2 mol %. In some embodiments, the glass composition may be substantially free or free of SrO. It should be understood that, in embodiments, any of the above ranges may be combined with any other range.

In embodiments, the glass composition may be substantially free or free of P$_2$O$_5$. The inclusion of P$_2$O$_5$ in the glass composition may undesirably reduce the meltability and formability of the glass composition, thereby impairing the manufacturability of the glass composition. Glass compositions intended for ion exchange strengthening may include P$_2$O$_5$ to enhance the speed of the ion exchange treatment, such as by decreasing the ion exchange treatment time required to produce a desired compressive stress or depth of compression. It is not necessary to include P$_2$O$_5$ in the glass compositions described herein to achieve the desired ion exchange performance. For this reason, P$_2$O$_5$ may be excluded from the glass composition to avoid negatively impacting the manufacturability of the glass composition while maintaining the desired ion exchange performance. In some embodiments, the glass composition may include P$_2$O$_5$, such as in amounts of greater than or equal to 0 mol % to less than or equal to 5 mol %.

In embodiments, the glass composition may optionally include one or more fining agents. In some embodiments, the fining agents may include, for example, SnO$_2$. In such embodiments, SnO$_2$ may be present in the glass composition in an amount less than or equal to 0.2 mol %, such as from greater than or equal to 0 mol % to less than or equal to 0.1 mol %, and all ranges and sub-ranges between the foregoing values. In other embodiments, SnO$_2$ may be present in the glass composition in an amount from greater than or equal to 0 mol % to less than or equal to 0.2 mol %, or greater than or equal to 0.1 mol % to less than or equal to 0.2 mol %, and all ranges and sub-ranges between the foregoing values. In some embodiments, the glass composition may be substantially free or free of SnO$_2$.

In embodiments, the glass composition may be substantially free of one or both of arsenic and antimony. In other embodiments, the glass composition may be free of one or both of arsenic and antimony.

In addition to the above individual components, glass compositions according to embodiments disclosed herein may be characterized by the concentration of high field strength components contained therein. These high field strength components contribute to the toughness of the glass and also increase the hardness of the glass. As utilized herein, the term "high field strength components" refers to the group including Al$_2$O$_3$, MgO, Li$_2$O, ZrO$_2$, La$_2$O$_3$, and Y$_2$O$_3$. If the concentration of high field strength components in the glass is too low, the toughness of the glass is undesirably decreased and the desired fracture toughness may not be achieved. Additionally, when the concentration of high field strength components in the glass is too high, the manufacturability of the glass may be undesirably decreased. In embodiments, the glass composition may comprise Al$_2$O$_3$+MgO+Li$_2$O+ZrO$_2$+La$_2$O$_3$+Y$_2$O$_3$ in a concentration of from greater than 23.0 mol % to less than 50.0 mol %, and all ranges and sub-ranges between the foregoing values. In some embodiments, the glass composition may comprise Al$_2$O$_3$+MgO+Li$_2$O+ZrO$_2$+La$_2$O$_3$+Y$_2$O$_3$ in a concentration greater than or equal to 23.5 mol %, such as greater than or equal to 24.0 mol %, greater than or equal to 25.0 mol %, greater than or equal to 26.0 mol %, greater than or equal to 27.0 mol %, greater than or equal to 28.0 mol %, greater than or equal to 29.0 mol %, greater than or equal to 30.0 mol %, greater than or equal to 31.0 mol %, greater than or equal to 32.0 mol %, greater than or equal to 33.0 mol %, greater than or equal to 34.0 mol %, greater than or equal to 35.0 mol %, greater than or equal to 36.0 mol %, greater than or equal to 37.0 mol %, greater than or equal to 38.0 mol %, greater than or equal to 39.0 mol %, greater than or equal to 40.0 mol %, greater than or equal to 41.0 mol %, greater than or equal to 42.0 mol %, greater than or equal to 43.0 mol %, greater than or equal to 44.0 mol %, greater than or equal to 45.0 mol %, greater than or equal to 46.0 mol %, greater than or equal to 47.0 mol %, greater than or equal to 48.0 mol %, or greater than or equal to 49.0 mol %. In some embodiments, the glass composition may comprise Al$_2$O$_3$+MgO+Li$_2$O+ZrO$_2$+La$_2$O$_3$+Y$_2$O$_3$ in a concentration less than or equal to 49.5 mol %, such as less than or equal to 49.0 mol %, less than or equal to 48.0 mol %, less than or equal to 47.0 mol %, less than or equal to 46.0 mol %, less than or equal to 45.0 mol %, less than or equal to 44.0 mol %, less than or equal to 43.0 mol %, less than or equal to 42.0 mol %, less than or equal to 41.0 mol %, less than or equal to 40.0 mol %, less than or equal to 39.0 mol %, less than or equal to 38.0 mol %, less than or equal to 37.0 mol %, less than or equal to 36.0 mol %, less than or equal to 35.0 mol %, less than or equal to 34.0 mol %, less than or equal to 33.0 mol %, less than or equal to 32.0 mol %, less than or equal to 31.0 mol %, less than or equal to 30.0 mol %, less than or equal to 29.0 mol %, less than or equal to 28.0 mol %, less than or equal to 27.0 mol %, less than or equal to 26.0 mol %, less than or equal to 25.0 mol %, or less than or equal to 24.0 mol %. It should be understood that, in embodiments, any of the above ranges may be combined with any other range. However, in other embodiments, the glass composition comprises $Al_2O_3+MgO+Li_2O+ZrO_2+La_2O_3+Y_2O_3$ in a concentration of from greater than or equal to 23.5 mol % to less than or equal to 49.5 mol %, such as from greater than or equal to 24.0 mol % to less than or equal to 49.0 mol %, from greater than or equal to 25.0 mol % to less than or equal to 48.0 mol %, from greater than or equal to 26.0 mol % to less than or equal to 47.0 mol %, from greater than or equal to 27.0 mol % to less than or equal to 46.0 mol %, from greater than or equal to 28.0 mol % to less than or equal to 45.0 mol %, from greater than or equal to 29.0 mol % to less than or equal to 44.0 mol %, from greater than or equal to 30.0 mol % to less than or equal to 43.0 mol %, from greater than or equal to 31.0 mol % to less than or equal to 42.0 mol %, from greater than or equal to 32.0 mol % to less than or equal to 41.0 mol %, from greater than or equal to 33.0 mol % to less than or equal to 40.0 mol %, from greater than or equal to 34.0 mol % to less than or equal to 39.0 mol %, from greater than or equal to 35.0 mol % to less than or equal to 38.0 mol %, or from greater than or equal to 36.0 mol % to less than or equal to 37.0 mol %, and all ranges and sub-ranges between the foregoing values. In some embodiments, the glass composition comprises $Al_2O_3+MgO+Li_2O+ZrO_2+La_2O_3+Y_2O_3$ in a concentration of from greater than or equal to 25.0 mol % to less than or equal to 46.0 mol %.

In embodiments, a relationship of $(Li_2O+Na_2O+MgO)/Al_2O_3$ is from greater than or equal to 0.90 to less than 1.30, where each component concentration is in mol %. This relationship maintains the meltability of the glass composition, allowing for improved manufacturability. In this relationship, the $Al_2O_3$ concentration of the glass composition is balanced against components that improve the manufacturability of the glass. $Al_2O_3$ is one of the strongest contributors to the toughness of the glass but also decreases the manufacturability of the glass. By balancing the effects of $Al_2O_3$ against the total content of $Li_2O+Na_2O+MgO$, each of which improves the manufacturability of the glass, the glass composition provides a high fracture toughness and desirable manufacturability. In some embodiments, the ratio of $(Li_2O+Na_2O+MgO)/Al_2O_3$ is greater than or equal to 0.95, such as greater than or equal to 1.00, greater than or equal to 1.05, greater than or equal to 1.10, greater than or equal to 1.15, greater than or equal to 1.20, or greater than or equal to 1.25. In some embodiments, a ratio of $(Li_2O+Na_2O+MgO)/Al_2O_3$ is less than or equal to 1.25, such as less than or equal to 1.20, less than or equal to 1.15, less than or equal to 1.10, less than or equal to 1.05, less than or equal to 1.00, or less than or equal to 0.95. It should be understood that, in embodiments, any of the above ranges may be combined with any other range. However, in other embodiments, the ratio of $(Li_2O+Na_2O+MgO)/Al_2O_3$ is from greater than or equal to 0.95 to less than or equal to 1.25, such as from greater than or equal to 1.00 to less than or equal to 1.20, or from greater than or equal to 1.05 to less than or equal to 1.15, and all ranges and sub-ranges between the foregoing values. In some embodiments, the ratio of $(Li_2O+Na_2O+MgO)/Al_2O_3$ is from greater than 0.90 to less than or equal to 1.00.

In embodiments, the glasses described herein may also be characterized by value of Formula I, below:

$$5.631+0.148\cdot Al_2O_3+0.142\cdot B_2O_3-0.062\cdot CaO-0.188\cdot K_2O+0.030\cdot MgO-0.099\cdot Na_2O-0.043\cdot Li_2O-0.188\cdot P_2O_5+0.020\cdot ZnO-0.062\cdot SrO+0.200\cdot ZrO_2 \quad \text{Formula I}=$$

wherein the amount of each component is in mol %. The value of Formula I is positively correlated with the fracture toughness. In embodiments, the glasses described herein that exhibit the desired fracture toughness have a Formula I value of greater than or equal to 6.5, such as greater than or equal to 7.0, greater than or equal to 7.5, greater than or equal to 8.0, greater than or equal to 8.5, or greater than or equal to 9.0. In embodiments, the glass may have a Formula I value of greater than or equal to 6.5 to less than or equal to 9.5, such as greater than or equal to 7.0 to less than or equal to 9.0, greater than or equal to 7.5 to less than or equal to 8.5, equal to 8.0, or any and all sub-ranges formed from any of these endpoints.

Physical properties of the alkali aluminosilicate glass compositions as disclosed above will now be discussed. These physical properties can be achieved by modifying the component amounts of the alkali aluminosilicate glass composition, as will be discussed in more detail with reference to the examples.

Glass compositions according to embodiments have a high fracture toughness. Without wishing to be bound by any particular theory, the high fracture toughness may impart improved drop performance to the glass compositions. The fracture toughness refers to the $K_{1C}$ value, and is measured by the chevron notched short bar or double torsion method. The chevron notched short bar (CNSB) method utilized to measure the $K_{1C}$ value is disclosed in Reddy, K. P. R. et al, "Fracture Toughness Measurement of Glass and Ceramic Materials Using Chevron-Notched Specimens," J. Am. Ceram. Soc., 71 [6], C-310-C-313 (1988) except that $Y^*_m$ is calculated using equation 5 of Bubsey, R. T. et al., "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, pp. 1-30 (October 1992). The double torsion method and fixture utilized to measure the $K_{1C}$ value is described in Shyam, A. and Lara-Curzio, E., "The double-torsion testing technique for determination of fracture toughness and slow crack growth of materials: A review," J. Mater. Sci., 41, pp. 4093-4104, (2006). The double torsion measurement method generally produces $K_{1C}$ values that are slightly higher than the chevron notched short bar method. Additionally, the $K_{1C}$ values are measured on non-strengthened glass articles, such as measuring the $K_{1C}$ value prior to ion exchanging a glass article.

In some embodiments, the glass compositions exhibit a $K_{1C}$ value measured by CNSB method of at least 0.75, such as at least 0.76, at least 0.77, at least 0.78, at least 0.79, at least 0.80, at least 0.81, at least 0.82, at least 0.83, at least 0.84, at least 0.85, at least 0.86, at least 0.87, at least 0.88, at least 0.89, at least 0.90, at least 0.91, at least 0.92, at least 0.93 at least 0.94, at least 0.95, or at least 0.96. In embodiments, the glass compositions exhibit a $K_{1C}$ value measured by CNSB method from greater than or equal to 0.75 to less than or equal to 1.00, such as from greater than or equal to 0.76 to less than or equal to 0.99, from greater than or equal to 0.77 to less than or equal to 0.98, from greater than or equal to 0.78 to less than or equal to 0.97, from greater than or equal to 0.79 to less than or equal to 0.96, from greater than or equal to 0.80 to less than or equal to 0.95, from greater than or equal to 0.81 to less than or equal to 0.94, from greater than or equal to 0.82 to less than or equal to 0.93, from greater than or equal to 0.83 to less than or equal to 0.92, from greater than or equal to 0.84 to less than or equal to 0.91, from greater than or equal to 0.85 to less than or equal to 0.90, from greater than or equal to 0.86 to less than or equal to 0.89, or from greater than or equal to 0.87 to less than or equal to 0.88, and all ranges and sub-ranges between the foregoing values.

In some embodiments, the glass compositions exhibit a $K_{1C}$ value measured by double torsion method of at least 0.80, such as at least 0.81, at least 0.82, at least 0.83, at least 0.84, at least 0.85, at least 0.86, at least 0.87, at least 0.88, at least 0.89, at least 0.90, at least 0.91, at least 0.92, at least 0.93 at least 0.94, at least 0.95, at least 0.96, at least 0.97, at least 0.98, at least 0.99, at least 1.00, at least 1.01, at least 1.02, at least 1.03, at least 1.04, at least 1.05, at least 1.06, at least 1.07, at least 1.08, at least 1.09, at least 1.10, at least 1.11, at least 1.12, at least 1.13, at least 1.14, or at least 1.15. In embodiments, the glass compositions exhibit a $K_{1C}$ value measured by double torsion method from greater than or equal to 0.80 to less than or equal to 1.20, such as from greater than or equal to 0.81 to less than or equal to 1.19, from greater than or equal to 0.82 to less than or equal to 1.18, from greater than or equal to 0.83 to less than or equal to 1.17, from greater than or equal to 0.84 to less than or equal to 1.16, from greater than or equal to 0.85 to less than or equal to 1.15, from greater than or equal to 0.86 to less than or equal to 1.14, from greater than or equal to 0.87 to less than or equal to 1.13, from greater than or equal to 0.88 to less than or equal to 1.12, from greater than or equal to 0.89 to less than or equal to 1.11, from greater than or equal to 0.90 to less than or equal to 1.10, from greater than or equal to 0.91 to less than or equal to 1.09, from greater than or equal to 0.92 to less than or equal to 1.08, from greater than or equal to 0.93 to less than or equal to 1.07, from greater than or equal to 0.94 to less than or equal to 1.06, from greater than or equal to 0.95 to less than or equal to 1.05, from greater than or equal to 0.96 to less than or equal to 1.04, from greater than or equal to 0.97 to less than or equal to 1.03, from greater than or equal to 0.98 to less than or equal to 1.02, from greater than or equal to 0.99 to less than or equal to 1.01, and all ranges and sub-ranges between the foregoing values.

In embodiments, the liquidus viscosity is less than or equal to 1000 kP, such as less than or equal to 800 kP, less than or equal to 600 kP, less than or equal to 400 kP, less than or equal to 200 kP, less than or equal to 100 kP, or less than or equal to 75 kP. In other embodiments, the liquidus viscosity is greater than or equal to 20 kP, such as greater than or equal to 40 kP, greater than or equal to 60 kP, greater than or equal to 80 kP, greater than or equal to 100 kP, greater than or equal to 120 kP, greater than or equal to 140 kP, or greater than or equal to 160 kP. It should be understood that, in embodiments, any of the above ranges may be combined with any other range. However, in yet other embodiments, the liquidus viscosity is from greater than or equal to 20 kP to less than or equal to 1000 kP, such as greater than or equal to 40 kP to less than or equal to 900 kP, greater than or equal to 60 kP to less than or equal to 800 kP, or greater than or equal to 80 kP to less than or equal to 700 kP, and all ranges and sub-ranges between the foregoing values. The liquidus viscosity is determined by the following method. First the liquidus temperature of the glass is measured in accordance with ASTM C829-81 (2015), titled "Standard Practice for Measurement of Liquidus Temperature of Glass by the Gradient Furnace Method". Next the viscosity of the glass at the liquidus temperature is measured in accordance with ASTM C965-96 (2012), titled "Standard Practice for Measuring Viscosity of Glass Above the Softening Point".

The addition of lithium to the glass composition also affects the Young's modulus (E), shear modulus (G), and Poisson's ratio (v) of the glass composition. In embodiments, the Young's modulus (E) of a glass composition may be from greater than or equal to 75 GPa to less than or equal to 100 GPa, such as from greater than or equal to 76 GPa to less than or equal to 99 GPa, from greater than or equal to 77 GPa to less than or equal to 98 GPa, from greater than or equal to 78 GPa to less than or equal to 97 GPa, from greater than or equal to 79 GPa to less than or equal to 96 GPa, from greater than or equal to 80 GPa to less than or equal to 95 GPa, from greater than or equal to 81 GPa to less than or equal to 94 GPa, from greater than or equal to 82 GPa to less than or equal to 93 GPa, from greater than or equal to 83 GPa to less than or equal to 92 GPa, from greater than or equal to 84 GPa to less than or equal to 91 GPa, from greater than or equal to 85 GPa to less than or equal to 90 GPa, from greater than or equal to 86 GPa to less than or equal to 89 GPa, or from greater than or equal to 87 GPa to less than or equal to 88 GPa, and all ranges and sub-ranges between the foregoing values. The Young's modulus values recited in this disclosure refer to a value as measured by a resonant ultrasonic spectroscopy technique of the general type set forth in ASTM E2001-13, titled "Standard Guide for Resonant Ultrasound Spectroscopy for Defect Detection in Both Metallic and Non-metallic Parts."

According to some embodiments, the glass composition may have a shear modulus (G) of from greater than or equal to 30 GPa to less than or equal to 40 GPa, such as from greater than or equal to 31 GPa to less than or equal to 39 GPa, from greater than or equal to 32 GPa to less than or equal to 38 GPa, from greater than or equal to 33 GPa to less than or equal to 37 GPa, or from greater than or equal to 34 GPa to less than or equal to 36 GPa, and all ranges and sub-ranges between the foregoing values. The shear modulus values recited in this disclosure refer to a value as measured by a resonant ultrasonic spectroscopy technique of the general type set forth in ASTM E2001-13, titled "Standard Guide for Resonant Ultrasound Spectroscopy for Defect Detection in Both Metallic and Non-metallic Parts."

According to some embodiments, the glass composition may have a Poisson's ratio (v) of from greater than or equal to 0.20 to less than or equal to 0.26, such as from greater than or equal to 0.21 to less than or equal to 0.25, from greater than or equal to 0.22 to less than or equal to 0.24, about 0.23, and all ranges and sub-ranges between the foregoing values. The Poisson's ratio value recited in this disclosure refers to a value as measured by a resonant ultrasonic spectroscopy technique of the general type set forth in ASTM E2001-13, titled "Standard Guide for Resonant Ultrasound Spectroscopy for Defect Detection in Both Metallic and Non-metallic Parts."

From the above compositions, glass articles according to embodiments may be formed by any suitable method, such as slot forming, float forming, rolling processes, fusion forming processes, etc.

The glass composition and the articles produced therefrom may be characterized by the manner in which it may be formed. For instance, the glass composition may be characterized as float-formable (i.e., formed by a float process), down-drawable and, in particular, fusion-formable or slot-drawable (i.e., formed by a down draw process such as a fusion draw process or a slot draw process).

Some embodiments of the glass articles described herein may be formed by a down-draw process. Down-draw processes produce glass articles having a uniform thickness that possess relatively pristine surfaces. Because the average flexural strength of the glass article is controlled by the amount and size of surface flaws, a pristine surface that has had minimal contact has a higher initial strength. In addition, down drawn glass articles have a very flat, smooth surface that can be used in its final application without costly grinding and polishing.

Some embodiments of the glass articles may be described as fusion-formable (i.e., formable using a fusion draw process). The fusion process uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass article. The fusion draw method offers the advantage that, because the two glass films flowing over the channel fuse together, neither of the outside surfaces of the resulting glass article comes in contact with any part of the apparatus. Thus, the surface properties of the fusion drawn glass article are not affected by such contact.

Some embodiments of the glass articles described herein may be formed by a slot draw process. The slot draw process is distinct from the fusion draw method. In slot draw processes, the molten raw material glass is provided to a drawing tank. The bottom of the drawing tank has an open slot with a nozzle that extends the length of the slot. The molten glass flows through the slot/nozzle and is drawn downward as a continuous glass article and into an annealing region.

In one or more embodiments, the glass articles described herein may exhibit an amorphous microstructure and may be substantially free of crystals or crystallites. In other words, the glass articles exclude glass-ceramic materials in some embodiments.

As mentioned above, in embodiments, the alkali aluminosilicate glass compositions can be strengthened, such as by ion exchange, making a glass that is damage resistant for applications such as, but not limited to, glass for display covers. With reference to FIG. 1, the glass has a first region under compressive stress (e.g., first and second compressive layers 120, 122 in FIG. 1) extending from the surface to a depth of compression (DOC) of the glass and a second region (e.g., central region 130 in FIG. 1) under a tensile stress or central tension (CT) extending from the DOC into the central or interior region of the glass. As used herein, DOC refers to the depth at which the stress within the glass article changes from compressive to tensile. At the DOC, the stress crosses from a positive (compressive) stress to a negative (tensile) stress and thus exhibits a stress value of zero.

According to the convention normally used in the art, compression or compressive stress is expressed as a negative (<0) stress and tension or tensile stress is expressed as a positive (>0) stress. Throughout this description, however, CS is expressed as a positive or absolute value—i.e., as recited herein, CS=|CS|. The compressive stress (CS) has a maximum at the surface of the glass, and the CS varies with distance d from the surface according to a function. Referring again to FIG. 1, a first segment 120 extends from first surface 110 to a depth $d_1$ and a second segment 122 extends from second surface 112 to a depth $d_2$. Together, these segments define a compression or CS of glass 100. Compressive stress (including surface CS) is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety.

In some embodiments, the CS of the glass article is from greater than or equal to 400 MPa to less than or equal to 800 MPa, such as from greater than or equal to 425 MPa to less than or equal to 775 MPa, from greater than or equal to 450 MPa to less than or equal to 750 MPa, from greater than or equal to 475 MPa to less than or equal to 725 MPa, from greater than or equal to 500 MPa to less than or equal to 700 MPa, from greater than or equal to 525 MPa to less than or equal to 675 MPa, from greater than or equal to 550 MPa to less than or equal to 650 MPa, or from greater than or equal to 575 MPa to less than or equal to 625 MPa, and all ranges and sub-ranges between the foregoing values.

In one or more embodiments, $Na^+$ and $K^+$ ions are exchanged into the glass article and the $Na^+$ ions diffuse to a deeper depth into the glass article than the $K^+$ ions. The depth of penetration of $K^+$ ions ("Potassium DOL") is distinguished from DOC because it represents the depth of potassium penetration as a result of an ion exchange process. The Potassium DOL is typically less than the DOC for the articles described herein. Potassium DOL is measured using a surface stress meter such as the commercially available FSM-6000 surface stress meter, manufactured by Orihara Industrial Co., Ltd. (Japan), which relies on accurate measurement of the stress optical coefficient (SOC), as described above with reference to the CS measurement. The Potassium DOL of each of first and second compressive layers 120, 122 is from greater than or equal to 5 μm to less than or equal to 30 μm, such as from greater than or equal to 6 μm to less than or equal to 25 μm, from greater than or equal to 7 μm to less than or equal to 20 μm, from greater than or equal to 8 μm to less than or equal to 15 μm, or from greater than or equal to 9 μm to less than or equal to 10 μm, and all ranges and sub-ranges between the foregoing values. In other embodiments, the potassium DOL of each of the first and second compressive layers 120, 122 is from greater than or equal to 6 μm to less than or equal to 30 μm, such as from greater than or equal to 10 μm to less than or equal to 30 μm, from greater than or equal to 15 μm to less than or equal to 30 μm, from greater than or equal to 20 μm to less than or equal to 30 μm, or from greater than or equal to 25 μm to less than or equal to 30 μm, and all ranges and sub-ranges between the foregoing values. In yet other embodiments, the potassium DOL of each of the first and second compressive layers 120, 122 is from greater than or equal to 5 μm to less than or equal to 25 μm, such as from greater than or equal to 5 μm to less than or equal to 20 μm, from greater than or equal to 5 μm to less than or equal to 15 μm, or from greater than or equal to 5 μm to less than or equal to 10 μm, and all ranges and sub-ranges between the foregoing values.

The compressive stress of both major surfaces (110, 112 in FIG. 1) is balanced by stored tension in the central region (130) of the glass. The maximum central tension (CT) and DOC values are measured using a scattered light polariscope (SCALP) technique known in the art. The Refracted near-field (RNF) method or SCALP may be used to measure the stress profile. When the RNF method is utilized to measure the stress profile, the maximum CT value provided by SCALP is utilized in the RNF method. In particular, the stress profile measured by RNF is force balanced and calibrated to the maximum CT value provided by a SCALP measurement. The RNF method is described in U.S. Pat. No. 8,854,623, entitled "Systems and methods for measuring a profile characteristic of a glass sample", which is incorporated herein by reference in its entirety. In particular, the RNF method includes placing the glass article adjacent to a reference block, generating a polarization-switched light beam that is switched between orthogonal polarizations at a rate of between 1 Hz and 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal.

In embodiments, the glass article may have a maximum CT greater than or equal to 60 MPa, such as greater than or equal to 70 MPa, greater than or equal to 80 MPa, greater than or equal to 90 MPa, greater than or equal to 100 MPa, greater than or equal to 110 MPa, greater than or equal to 120 MPa, greater than or equal to 130 MPa, greater than or equal to 140 MPa, or greater than or equal to 150 MPa, and all ranges and sub-ranges between the foregoing values. In some embodiments, the glass article may have a maximum CT less than or equal to 200 MPa, such as less than or equal to 190 MPa, less than or equal to 180 MPa, less than or equal to 170 MPa, less than or equal to 160 MPa, less than or equal to 150 MPa, less than or equal to 140 MPa, less than or equal to 130 MPa, less than or equal to 120 MPa, less than or equal to 110 MPa, less than or equal to 100 MPa, less than or equal to 90 MPa, less than or equal to 85 MPa, or less than or equal to 80 MPa, and all ranges and sub-ranges between the foregoing values. It should be understood that, in embodiments, any of the above ranges may be combined with any other range. However, in other embodiments, the glass article may have a maximum CT from greater than or equal to 60 MPa to less than or equal to 200 MPa, such as from greater than or equal to 70 MPa to less than or equal to 190 MPa, from greater than or equal to 80 MPa to less than or equal to 180 MPa, from greater than or equal to 90 MPa to less than or equal to 170 MPa, from greater than or equal to 100 MPa to less than or equal to 160 MPa, from greater than or equal to 110 MPa to less than or equal to 150 MPa, or from greater than or equal to 120 MPa to less than or equal to 140 MPa, and all ranges and sub-ranges between the foregoing values.

As noted above, DOC is measured using a scattered light polariscope (SCALP) technique known in the art. The DOC is provided in some embodiments herein as a portion of the thickness (t) of the glass article. In embodiments, the glass articles may have a depth of compression (DOC) from greater than or equal to 0.15 t to less than or equal to 0.25 t, such as from greater than or equal to 0.18 t to less than or equal to 0.22 t, or from greater than or equal to 0.19 t to less than or equal to 0.21 t, and all ranges and sub-ranges between the foregoing values. In other embodiments, the glass articles may have a DOC from greater than or equal to 0.16 to less than or equal to 0.2 t, such as from greater than or equal to 0.17 t to less than or equal to 0.25 t, from greater than or equal to 0.18 t to less than or equal to 0.25 t, from greater than or equal to 0.19 t to less than or equal to 0.25 t, from greater than or equal to 0.20 t to less than or equal to 0.25 t, from greater than or equal to 0.21 t to less than or equal to 0.25 t, from greater than or equal to 0.22 t to less than or equal to 0.25 t, from greater than or equal to 0.23 t to less than or equal to 0.25 t, or from greater than or equal to 0.24 t to less than or equal to 0.25 t, and all ranges and sub-ranges between the foregoing values. In yet other embodiments, the glass articles may have a DOC from greater than or equal to 0.15 t to less than or equal to 0.24 t, such as from greater than or equal to 0.15 t to less than or equal to 0.23 t, from greater than or equal to 0.15 t to less than or equal to 0.22 t, from greater than or equal to 0.15 t to less than or equal to 0.21 t, from greater than or equal to 0.15 t to less than or equal to 0.20 t, from greater than or equal to 0.15 t to less than or equal to 0.19 t, from greater than or equal to 0.15 t to less than or equal to 0.18 t, from greater than or equal to 0.15 t to less than or equal to 0.17 t, or from greater than or equal to 0.15 t to less than or equal to 0.16 t, and all ranges and sub-ranges between the foregoing values. In some embodiments, the glass articles may have a DOC of at least 0.20 t.

Compressive stress layers may be formed in the glass by exposing the glass to an ion exchange solution. In embodiments, the ion exchange solution may be molten nitrate salt. In some embodiments, the ion exchange solution may be molten $KNO_3$, molten $NaNO_3$, or combinations thereof. In certain embodiments, the ion exchange solution may comprise less than about 95% molten $KNO_3$, such as less than about 90% molten $KNO_3$, less than about 80% molten $KNO_3$, less than about 70% molten $KNO_3$, less than about 60% molten $KNO_3$, or less than about 50% molten $KNO_3$. In certain embodiments, the ion exchange solution may comprise at least about 5% molten $NaNO_3$, such as at least about 10% molten $NaNO_3$, at least about 20% molten $NaNO_3$, at least about 30% molten $NaNO_3$, or at least about 40% molten $NaNO_3$. In other embodiments, the ion exchange solution may comprise about 95% molten $KNO_3$ and about 5% molten $NaNO_3$, about 94% molten $KNO_3$ and about 6% molten $NaNO_3$, about 93% molten $KNO_3$ and about 7% molten $NaNO_3$, about 80% molten $KNO_3$ and about 20% molten $NaNO_3$, about 75% molten $KNO_3$ and about 25% molten $NaNO_3$, about 70% molten $KNO_3$ and about 30% molten $NaNO_3$, about 65% molten $KNO_3$ and about 35% molten $NaNO_3$, or about 60% molten $KNO_3$ and about 40% molten $NaNO_3$, and all ranges and sub-ranges between the foregoing values. In embodiments, other sodium and potassium salts may be used in the ion exchange solution, such as, for example sodium or potassium nitrites, phosphates, or sulfates. In some embodiments, the ion exchange solution may include lithium salts, such as $LiNO_3$.

The glass composition may be exposed to the ion exchange solution by dipping a glass article made from the glass composition into a bath of the ion exchange solution, spraying the ion exchange solution onto a glass article made from the glass composition, or otherwise physically applying the ion exchange solution to a glass article made from the glass composition. Upon exposure to the glass composition, the ion exchange solution may, according to embodiments, be at a temperature from greater than or equal to 400° C. to less than or equal to 500° C., such as from greater than or equal to 410° C. to less than or equal to 490° C., from greater than or equal to 420° C. to less than or equal to 480° C., from greater than or equal to 430° C. to less than or equal to 470° C., or from greater than or equal to 440° C. to less than or equal to 460° C., and all ranges and sub-ranges between the foregoing values. In embodiments, the glass composition may be exposed to the ion exchange solution for a duration from greater than or equal to 4 hours to less than or equal to 48 hours, such as from greater than or equal to 8 hours to less than or equal to 44 hours, from greater than or equal to 12 hours to less than or equal to 40 hours, from greater than or equal to 16 hours to less than or equal to 36 hours, from greater than or equal to 20 hours to less than or equal to 32 hours, or from greater than or equal to 24 hours to less than or equal to 28 hours, and all ranges and sub-ranges between the foregoing values.

The ion exchange process may be performed in an ion exchange solution under processing conditions that provide an improved compressive stress profile as disclosed, for example, in U.S. Patent Application Publication No. 2016/0102011, which is incorporated herein by reference in its entirety. In some embodiments, the ion exchange process may be selected to form a parabolic stress profile in the glass articles, such as those stress profiles described in U.S. Patent Application Publication No. 2016/0102014, which is incorporated herein by reference in its entirety.

After an ion exchange process is performed, it should be understood that a composition at the surface of a glass article may be different than the composition of the as-formed glass article (i.e., the glass article before it undergoes an ion exchange process). This results from one type of alkali metal ion in the as-formed glass, such as, for example $Li^+$ or $Na^+$, being replaced with larger alkali metal ions, such as, for example $Na^+$ or $K^+$, respectively. However, the glass composition at or near the center of the depth of the glass article will, in embodiments, still have the composition of the as-formed glass article.

Figure 2A:
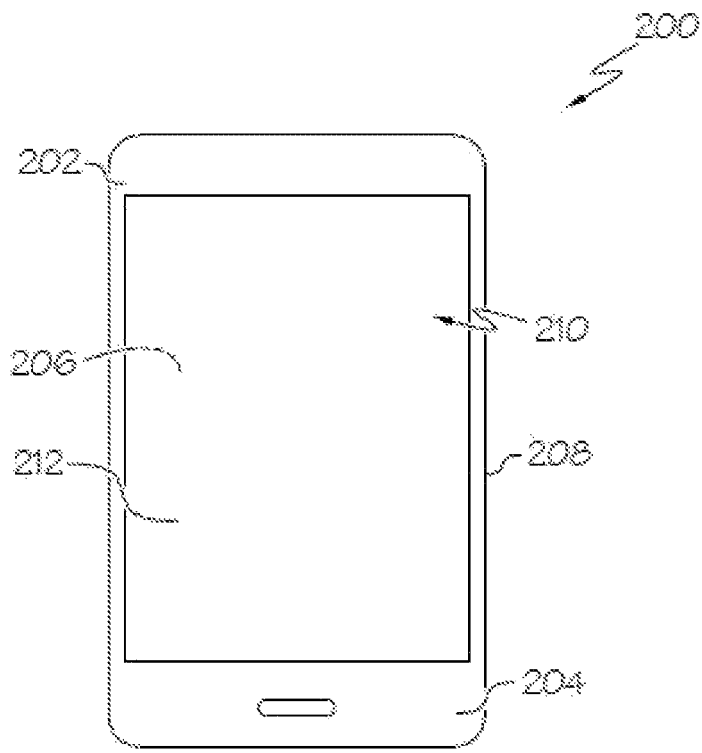
FIG. 2A is a plan view of an exemplary electronic device incorporating any of the glass articles disclosed herein.
Figure 2B:
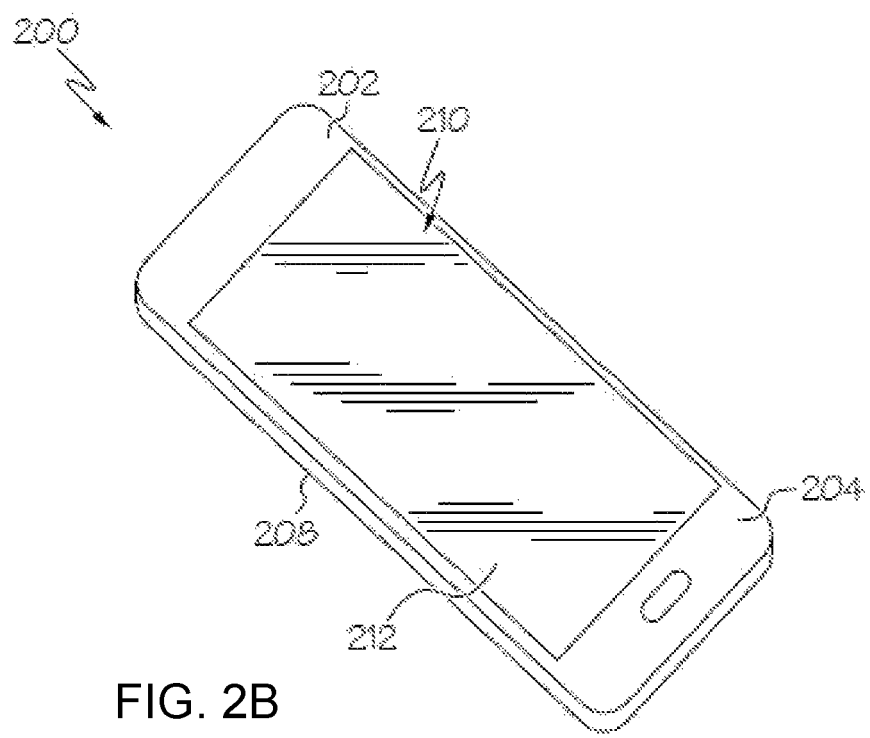
FIG. 2B is a perspective view of the exemplary electronic device of FIG. 2A.

The glass articles disclosed herein may be incorporated into another article such as an article with a display (or display articles) (e.g., consumer electronics, including mobile phones, tablets, computers, navigation systems, and the like), architectural articles, transportation articles (e.g., automobiles, trains, aircraft, sea craft, etc.), appliance articles, or any article that requires some transparency, scratch-resistance, abrasion resistance or a combination thereof. An exemplary article incorporating any of the glass articles disclosed herein is shown in FIGS. 2A and 2B. Specifically, FIGS. 2A and 2B show a consumer electronic device 200 including a housing 202 having front 204, back 206, and side surfaces 208; electrical components (not shown) that are at least partially inside or entirely within the housing and including at least a controller, a memory, and a display 210 at or adjacent to the front surface of the housing; and a cover substrate 212 at or over the front surface of the housing such that it is over the display. In some embodiments, the cover substrate 212 may include any of the glass articles disclosed herein.

EXAMPLES

Embodiments will be further clarified by the following examples. It should be understood that these examples are not limiting to the embodiments described above.

Glass compositions having components listed in Table 1 below were prepared by conventional glass forming methods. In Table 1, all components are in mol %, and the $K_{1C}$ fracture toughness, the Poisson's Ratio (v), the Young's modulus (E), and the shear modulus (G) of the glass compositions were measured according to the methods disclosed in this specification. The value of Formula I for each of the examples is also reported in Table 1.

TABLE 1

| Component (mol %) | A | B | C | D | E | F |
|---|---|---|---|---|---|---|
| $Al_2O_3$ | 20.20 | 20.10 | 18.93 | 18.70 | 15.63 | 15.91 |
| $B_2O_3$ | 0.00 | 0.00 | 0.00 | 0.00 | 5.26 | 5.30 |
| CaO | 0.07 | 3.95 | 0.03 | 0.03 | 1.54 | 1.51 |
| $K_2O$ | 0.04 | 0.04 | 0.01 | 0.01 | 0.01 | 0.01 |
| MgO | 6.87 | 5.89 | 0.03 | 0.03 | 2.48 | 2.44 |
| $Na_2O$ | 3.49 | 3.49 | 4.34 | 5.60 | 2.89 | 2.85 |
| $SiO_2$ | 60.15 | 57.38 | 63.87 | 64.09 | 63.82 | 63.11 |
| $SnO_2$ | 0.03 | 0.03 | 0.02 | 0.02 | 0.05 | 0.05 |
| $La_2O_3$ | 0.00 | 0.00 | 0.00 | 0.00 | 0.00 | 0.00 |
| $Li_2O$ | 8.00 | 8.00 | 12.74 | 11.50 | 8.29 | 8.78 |
| $ZrO_2$ | 0.00 | 0.00 | 0.00 | 0.00 | 0.00 | 0.00 |
| SrO | 1.03 | 1.02 | 0.00 | 0.00 | 0.00 | 0.00 |
| $Y_2O_3$ | 0.00 | 0.00 | 0.00 | 0.00 | 0.00 | 0.00 |
| $(Li_2O + Na_2O + MgO)/Al_2O_3$ | 0.91 | 0.86 | 0.90 | 0.92 | 0.87 | 0.88 |
| $Al_2O_3 + MgO + La_2O_3 + Y_2O_3 + ZrO_2$ | 35.08 | 33.99 | 31.70 | 30.23 | 26.40 | 27.13 |
| Formula I | 8.06 | 7.78 | 7.45 | 7.35 | 8.03 | 8.06 |
| $K_{1C}$ (CNSB) | | | 0.788 | 0.777 | 0.794 | 0.829 |
| $K_{1C}$ (Double Torsion) | | | | | | |
| Poisson's Ratio | | | 0.219 | 0.219 | 0.224 | 0.226 |
| E (GPa) | | | 84.33 | 83.44 | 79.92 | 80.27 |
| G (GPa) | | | 34.59 | 34.24 | 32.66 | 32.73 |

| Component (mol %) | G | H | I | J | K | L |
|---|---|---|---|---|---|---|
| $Al_2O_3$ | 18.51 | 19.24 | 18.58 | 18.57 | 19.09 | 20.00 |
| $B_2O_3$ | 0.00 | 0.00 | 0.00 | 0.00 | 0.00 | 0.00 |
| CaO | 0.03 | 0.03 | 0.04 | 0.04 | 0.03 | 0.03 |
| $K_2O$ | 0.01 | 0.01 | 0.00 | 0.00 | 0.00 | 0.00 |
| MgO | 0.02 | 0.03 | 2.94 | 5.87 | 0.02 | 0.02 |
| $Na_2O$ | 6.87 | 6.79 | 3.89 | 0.93 | 4.41 | 4.36 |
| $SiO_2$ | 64.53 | 64.00 | 64.50 | 64.61 | 63.58 | 62.84 |
| $SnO_2$ | 0.04 | 0.04 | 0.04 | 0.04 | 0.03 | 0.03 |
| $La_2O_3$ | 0.00 | 0.00 | 0.00 | 0.00 | 0.00 | 0.00 |
| $Li_2O$ | 9.95 | 9.84 | 9.95 | 9.91 | 12.77 | 12.67 |
| $ZrO_2$ | 0.00 | 0.00 | 0.00 | 0.00 | 0.00 | 0.00 |

TABLE 1-continued

| | | | | | | |
|---|---|---|---|---|---|---|
| SrO | 0.00 | 0.00 | 0.00 | 0.00 | 0.00 | 0.00 |
| $Y_2O_3$ | 0.00 | 0.00 | 0.00 | 0.00 | 0.00 | 0.00 |
| $(Li_2O + Na_2O + MgO)/Al_2O_3$ | 0.91 | 0.87 | 0.90 | 0.90 | 0.90 | 0.85 |
| $Al_2O_3 + MgO + La_2O_3 + Y_2O_3 + ZrO_2$ | 28.48 | 29.11 | 31.47 | 34.34 | 31.88 | 32.69 |
| Formula I | 7.26 | 7.38 | 7.65 | 8.03 | 7.47 | 7.61 |
| $K_{1C}$ (CNSB) | 0.787 | 0.794 | 0.822 | 0.863 | | |
| $K_{1C}$ (Double Torsion) | | | | | | |
| Poisson's Ratio | 0.213 | 0.217 | 0.221 | 0.226 | | |
| E (GPa) | 82.68 | 83.58 | 86.68 | 90.26 | | |
| G (GPa) | 34.11 | 34.31 | 35.48 | 36.79 | | |

| Component (mol %) | M | N | O | P | Q | R |
|---|---|---|---|---|---|---|
| $Al_2O_3$ | 19.00 | 19.01 | 24.52 | 23.84 | 23.26 | 22.68 |
| $B_2O_3$ | 0.00 | 0.00 | 0.00 | 0.00 | 0.00 | 0.00 |
| CaO | 0.03 | 0.04 | 0.03 | 0.03 | 0.03 | 0.03 |
| $K_2O$ | 0.00 | 0.00 | 0.00 | 0.00 | 0.00 | 0.00 |
| MgO | 1.03 | 2.04 | 0.03 | 0.03 | 0.03 | 0.03 |
| $Na_2O$ | 3.40 | 2.41 | 3.38 | 4.87 | 6.36 | 7.90 |
| $SiO_2$ | 63.81 | 63.77 | 54.28 | 54.32 | 54.32 | 54.44 |
| $SnO_2$ | 0.03 | 0.03 | 0.01 | 0.02 | 0.02 | 0.01 |
| $La_2O_3$ | 0.00 | 0.00 | 0.00 | 0.00 | 0.00 | 0.00 |
| $Li_2O$ | 12.65 | 12.65 | 17.71 | 16.85 | 15.94 | 14.86 |
| $ZrO_2$ | 0.00 | 0.00 | 0.00 | 0.00 | 0.00 | 0.00 |
| SrO | 0.00 | 0.00 | 0.00 | 0.00 | 0.00 | 0.00 |
| $Y_2O_3$ | 0.00 | 0.00 | 0.00 | 0.00 | 0.00 | 0.00 |
| $(Li_2O + Na_2O + MgO)/Al_2O_3$ | 0.90 | 0.90 | 0.86 | 0.91 | 0.96 | 1.00 |
| $Al_2O_3 + MgO + La_2O_3 + Y_2O_3 + ZrO_2$ | 32.68 | 33.70 | 42.26 | 40.72 | 39.23 | 37.57 |
| Formula I | 7.59 | 7.72 | 8.16 | 7.95 | 7.76 | 7.57 |
| $K_{1C}$ (CNSB) | | | | | | |
| $K_{1C}$ (Double Torsion) | | | | | | |
| Poisson's Ratio | | | | | | |
| E (GPa) | | | | | | |
| G (GPa) | | | | | | |

| Component (mol %) | S | T | U | V | W | X |
|---|---|---|---|---|---|---|
| $Al_2O_3$ | 16.51 | 17.03 | 17.48 | 18.17 | 18.44 | 18.93 |
| $B_2O_3$ | 5.44 | 5.42 | 5.42 | 5.41 | 5.35 | 5.35 |
| CaO | 1.54 | 1.54 | 1.53 | 1.56 | 1.53 | 1.53 |
| $K_2O$ | 0.01 | 0.01 | 0.01 | 0.01 | 0.01 | 0.01 |
| MgO | 2.53 | 2.57 | 2.53 | 2.63 | 2.53 | 2.53 |
| $Na_2O$ | 2.87 | 2.88 | 2.88 | 2.87 | 2.86 | 2.85 |
| $SiO_2$ | 61.68 | 60.66 | 59.77 | 58.49 | 57.90 | 56.97 |
| $SnO_2$ | 0.05 | 0.05 | 0.05 | 0.05 | 0.05 | 0.06 |
| $La_2O_3$ | 0.00 | 0.00 | 0.00 | 0.00 | 0.00 | 0.00 |
| $Li_2O$ | 9.34 | 9.81 | 10.30 | 10.78 | 11.29 | 11.75 |
| $ZrO_2$ | 0.00 | 0.00 | 0.00 | 0.00 | 0.00 | 0.00 |
| SrO | 0.00 | 0.00 | 0.00 | 0.00 | 0.00 | 0.00 |
| $Y_2O_3$ | 0.00 | 0.00 | 0.00 | 0.00 | 0.00 | 0.00 |
| $(Li_2O + Na_2O + MgO)/Al_2O_3$ | 0.89 | 0.90 | 0.90 | 0.90 | 0.90 | 0.91 |
| $Al_2O_3 + MgO + La_2O_3 + Y_2O_3 + ZrO_2$ | 28.38 | 29.41 | 30.31 | 31.57 | 32.26 | 33.21 |
| Formula I | 8.14 | 8.19 | 8.24 | 8.32 | 8.33 | 8.38 |
| $K_{1C}$ (CNSB) | 0.798 | 0.826 | 0.788 | 0.785 | 0.817 | 0.817 |
| $K_{1C}$ (Double Torsion) | | | | | | |
| Poisson's Ratio | 0.222 | 0.227 | 0.23 | 0.226 | 0.23 | 0.23 |
| E (GPa) | 80.61 | 81.16 | 81.99 | 81.51 | 82.40 | 83.09 |
| G (GPa) | 33.00 | 33.07 | 33.35 | 33.21 | 33.49 | 33.76 |

| Component (mol %) | Y | Z | AA | AB | AC | AD |
|---|---|---|---|---|---|---|
| $Al_2O_3$ | 23.97 | 19.99 | 23.98 | 23.97 | 22.17 | 22.15 |
| $B_2O_3$ | 1.98 | 1.94 | 1.97 | 2.02 | 2.00 | 1.95 |
| CaO | 0.05 | 0.04 | 0.06 | 0.06 | 0.05 | 0.06 |
| $K_2O$ | 0.01 | 0.01 | 0.01 | 0.01 | 0.01 | 0.01 |
| MgO | 5.84 | 1.97 | 9.73 | 11.65 | 7.96 | 9.80 |
| $Na_2O$ | 1.86 | 1.88 | 1.87 | 1.86 | 1.86 | 1.87 |
| $SiO_2$ | 50.32 | 58.20 | 50.35 | 50.33 | 53.89 | 54.05 |
| $SnO_2$ | 0.03 | 0.03 | 0.03 | 0.03 | 0.03 | 0.03 |
| $La_2O_3$ | 0.00 | 0.00 | 0.00 | 0.00 | 0.00 | 0.00 |
| $Li_2O$ | 15.93 | 15.94 | 11.97 | 10.06 | 12.01 | 10.06 |
| $ZrO_2$ | 0.00 | 0.00 | 0.00 | 0.00 | 0.00 | 0.00 |
| SrO | 0.00 | 0.00 | 0.00 | 0.00 | 0.00 | 0.00 |
| $Y_2O_3$ | 0.00 | 0.00 | 0.00 | 0.00 | 0.00 | 0.00 |
| $(Li_2O + Na_2O + MgO)/Al_2O_3$ | 0.99 | 0.99 | 0.98 | 0.98 | 0.98 | 0.98 |
| $Al_2O_3 + MgO + La_2O_3 + Y_2O_3 + ZrO_2$ | 45.74 | 37.90 | 45.68 | 45.67 | 42.14 | 42.01 |
| Formula I | 8.76 | 8.05 | 9.05 | 9.19 | 8.73 | 8.86 |
| $K_{1C}$ (CNSB) | | | | | | |
| $K_{1C}$ (Double Torsion) | 1.150 | 1.000 | 1.020 | 1.010 | 1.010 | 1.040 |
| Poisson's Ratio | 0.238 | 0.226 | 0.243 | 0.244 | 0.235 | 0.24 |

TABLE 1-continued

| | | | | | | |
|---|---|---|---|---|---|---|
| E (GPa) | 92.19 | 85.64 | 95.22 | 96.67 | 91.84 | 93.70 |
| G (GPa) | 37.21 | 34.93 | 38.31 | 38.86 | 37.21 | 37.76 |

| Component (mol %) | AE | AF | AG | AH | AI | AJ |
|---|---|---|---|---|---|---|
| $Al_2O_3$ | 20.16 | 20.07 | 18.04 | 18.09 | 23.95 | 23.97 |
| $B_2O_3$ | 1.99 | 2.04 | 1.94 | 2.00 | 3.93 | 3.92 |
| CaO | 0.05 | 0.05 | 0.04 | 0.05 | 0.06 | 0.06 |
| $K_2O$ | 0.01 | 0.01 | 0.01 | 0.01 | 0.01 | 0.01 |
| MgO | 5.92 | 7.78 | 3.90 | 5.90 | 7.82 | 9.74 |
| $Na_2O$ | 1.88 | 1.88 | 1.89 | 1.89 | 1.95 | 1.95 |
| $SiO_2$ | 57.95 | 58.08 | 62.18 | 61.92 | 50.28 | 50.43 |
| $SnO_2$ | 0.03 | 0.03 | 0.03 | 0.03 | 0.03 | 0.03 |
| $La_2O_3$ | 0.00 | 0.00 | 0.00 | 0.00 | 0.00 | 0.00 |
| $Li_2O$ | 11.99 | 10.04 | 11.96 | 10.08 | 11.95 | 9.87 |
| $ZrO_2$ | 0.00 | 0.00 | 0.00 | 0.00 | 0.00 | 0.00 |
| SrO | 0.00 | 0.00 | 0.00 | 0.00 | 0.00 | 0.00 |
| $Y_2O_3$ | 0.00 | 0.00 | 0.00 | 0.00 | 0.00 | 0.00 |
| $(Li_2O + Na_2O + MgO)/Al_2O_3$ | 0.98 | 0.98 | 0.98 | 0.99 | 0.91 | 0.90 |
| $Al_2O_3 + MgO + La_2O_3 + Y_2O_3 + ZrO_2$ | 38.07 | 37.88 | 33.90 | 34.07 | 43.71 | 43.59 |
| Formula I | 8.37 | 8.50 | 7.99 | 8.14 | 9.26 | 9.41 |
| $K_{IC}$ (CNSB) | | | | | | |
| $K_{IC}$ (Double Torsion) | 0.990 | 1.020 | 0.980 | 0.980 | 0.970 | 1.030 |
| Poisson's Ratio | 0.233 | 0.235 | 0.226 | 0.225 | 0.242 | 0.244 |
| E (GPa) | 88.88 | 90.47 | 85.99 | 86.88 | 92.12 | 93.84 |
| G (GPa) | 36.03 | 36.65 | 35.07 | 35.48 | 37.07 | 37.69 |

| Component (mol %) | AK | AL | AM | AN | AO | AP |
|---|---|---|---|---|---|---|
| $Al_2O_3$ | 21.96 | 22.10 | 19.96 | 20.32 | 18.07 | 18.02 |
| $B_2O_3$ | 3.91 | 3.92 | 3.84 | 3.97 | 3.84 | 3.90 |
| CaO | 0.05 | 0.05 | 0.04 | 0.05 | 0.04 | 0.04 |
| $K_2O$ | 0.01 | 0.01 | 0.01 | 0.01 | 0.01 | 0.01 |
| MgO | 5.89 | 7.87 | 3.91 | 6.05 | 1.98 | 3.92 |
| $Na_2O$ | 1.97 | 1.96 | 1.96 | 1.95 | 1.96 | 1.95 |
| $SiO_2$ | 54.20 | 54.08 | 58.27 | 57.65 | 62.14 | 62.22 |
| $SnO_2$ | 0.03 | 0.03 | 0.03 | 0.03 | 0.03 | 0.03 |
| $La_2O_3$ | 0.00 | 0.00 | 0.00 | 0.00 | 0.00 | 0.00 |
| $Li_2O$ | 11.96 | 9.95 | 11.93 | 9.95 | 11.90 | 9.89 |
| $ZrO_2$ | 0.00 | 0.00 | 0.00 | 0.00 | 0.00 | 0.00 |
| SrO | 0.00 | 0.00 | 0.00 | 0.00 | 0.00 | 0.00 |
| $Y_2O_3$ | 0.00 | 0.00 | 0.00 | 0.00 | 0.00 | 0.00 |
| $(Li_2O + Na_2O + MgO)/Al_2O_3$ | 0.90 | 0.90 | 0.89 | 0.88 | 0.88 | 0.87 |
| $Al_2O_3 + MgO + La_2O_3 + Y_2O_3 + ZrO_2$ | 39.82 | 39.92 | 35.81 | 36.32 | 31.95 | 31.82 |
| Formula I | 8.90 | 9.07 | 8.54 | 8.76 | 8.20 | 8.35 |
| $K_{IC}$ (CNSB) | | | | | | |
| $K_{IC}$ (Double Torsion) | 0.990 | 1.010 | 1.020 | 1.030 | 0.970 | 0.830 |
| Poisson's Ratio | 0.237 | 0.241 | 0.231 | 0.232 | 0.22 | 0.227 |
| E (GPa) | 88.95 | 90.88 | 85.71 | 87.37 | 82.27 | 84.13 |
| G (GPa) | 35.97 | 36.59 | 34.79 | 35.48 | 33.69 | 34.24 |

| Component (mol %) | AQ | AR | AS | AT | AU | AV |
|---|---|---|---|---|---|---|
| $Al_2O_3$ | 15.92 | 21.65 | 21.98 | 20.06 | 19.53 | 18.05 |
| $B_2O_3$ | 3.91 | 5.80 | 5.84 | 5.87 | 5.87 | 5.84 |
| CaO | 0.04 | 0.05 | 0.06 | 0.05 | 0.05 | 0.04 |
| $K_2O$ | 0.01 | 0.01 | 0.01 | 0.01 | 0.01 | 0.01 |
| MgO | 1.97 | 7.62 | 9.75 | 5.89 | 7.51 | 3.93 |
| $Na_2O$ | 1.86 | 1.85 | 1.83 | 1.85 | 1.86 | 1.86 |
| $SiO_2$ | 66.11 | 50.99 | 50.46 | 54.21 | 55.08 | 58.23 |
| $SnO_2$ | 0.00 | 0.00 | 0.00 | 0.00 | 0.00 | 0.00 |
| $La_2O_3$ | 0.00 | 0.00 | 0.00 | 0.00 | 0.00 | 0.00 |
| $Li_2O$ | 10.10 | 11.94 | 9.98 | 11.98 | 10.01 | 11.95 |
| $ZrO_2$ | 0.00 | 0.00 | 0.00 | 0.00 | 0.00 | 0.00 |
| SrO | 0.00 | 0.00 | 0.00 | 0.00 | 0.00 | 0.00 |
| $Y_2O_3$ | 0.00 | 0.00 | 0.00 | 0.00 | 0.00 | 0.00 |
| $(Li_2O + Na_2O + MgO)/Al_2O_3$ | 0.87 | 0.99 | 0.98 | 0.98 | 0.99 | 0.98 |
| $Al_2O_3 + MgO + La_2O_3 + Y_2O_3 + ZrO_2$ | 27.99 | 41.21 | 41.71 | 37.93 | 37.05 | 33.92 |
| Formula I | 7.98 | 9.19 | 9.39 | 8.91 | 8.96 | 8.55 |
| $K_{IC}$ (CNSB) | 0.828 | 0.834 | 0.882 | 0.828 | 0.957 | 0.847 |
| $K_{IC}$ (Double Torsion) | | | | | | |
| Poisson's Ratio | 0.221 | 0.234 | 0.247 | 0.239 | 0.245 | 0.235 |
| E (GPa) | 81.03 | 88.47 | 91.15 | 85.92 | 87.92 | 83.16 |
| G (GPa) | 33.14 | 35.83 | 36.52 | 34.66 | 35.35 | 33.69 |

| Component (mol %) | AW | AX | AY | AZ | BA | BB |
|---|---|---|---|---|---|---|
| $Al_2O_3$ | 18.08 | 16.00 | 15.99 | 14.01 | 22.10 | 22.25 |
| $B_2O_3$ | 5.81 | 5.71 | 5.72 | 5.80 | 7.82 | 8.01 |
| CaO | 0.04 | 0.03 | 0.04 | 0.03 | 0.05 | 0.05 |

TABLE 1-continued

| Component | | | | | | |
|---|---|---|---|---|---|---|
| $K_2O$ | 0.01 | 0.01 | 0.01 | 0.01 | 0.01 | 0.01 |
| MgO | 5.87 | 1.97 | 3.89 | 1.95 | 5.88 | 7.92 |
| $Na_2O$ | 1.85 | 1.84 | 1.85 | 1.85 | 1.82 | 1.85 |
| $SiO_2$ | 58.30 | 62.44 | 62.53 | 66.29 | 50.33 | 49.82 |
| $SnO_2$ | 0.00 | 0.00 | 0.00 | 0.03 | 0.03 | 0.03 |
| $La_2O_3$ | 0.00 | 0.00 | 0.00 | 0.00 | 0.00 | 0.00 |
| $Li_2O$ | 9.94 | 11.90 | 9.90 | 10.01 | 11.94 | 10.03 |
| $ZrO_2$ | 0.00 | 0.00 | 0.00 | 0.00 | 0.00 | 0.00 |
| SrO | 0.00 | 0.00 | 0.00 | 0.00 | 0.00 | 0.00 |
| $Y_2O_3$ | 0.00 | 0.00 | 0.00 | 0.00 | 0.00 | 0.00 |
| $(Li_2O + Na_2O + MgO)/Al_2O_3$ | 0.98 | 0.98 | 0.98 | 0.99 | 0.89 | 0.89 |
| $Al_2O_3 + MgO + La_2O_3 + Y_2O_3 + ZrO_2$ | 33.90 | 29.87 | 29.78 | 25.97 | 39.92 | 40.20 |
| Formula I | 8.69 | 8.17 | 8.31 | 7.97 | 9.49 | 9.68 |
| $K_{1C}$ (CNSB) | 0.844 | 0.790 | 0.786 | | | |
| $K_{1C}$ (Double Torsion) | | | | | | |
| Poisson's Ratio | 0.232 | 0.226 | 0.224 | 0.216 | 0.245 | 0.246 |
| E (GPa) | 84.47 | 79.58 | 81.03 | 77.03 | 86.26 | 87.64 |
| G (GPa) | 34.31 | 32.45 | 33.07 | 31.69 | 34.66 | 35.14 |

| Component (mol %) | BC | BD | BE | BF | BG | BH |
|---|---|---|---|---|---|---|
| $Al_2O_3$ | 20.10 | 19.69 | 18.05 | 18.10 | 16.07 | 14.00 |
| $B_2O_3$ | 7.75 | 7.89 | 7.63 | 7.71 | 7.65 | 3.84 |
| CaO | 0.04 | 0.05 | 0.04 | 0.04 | 0.03 | 0.03 |
| $K_2O$ | 0.01 | 0.01 | 0.01 | 0.01 | 0.01 | 0.01 |
| MgO | 3.92 | 5.72 | 1.96 | 3.94 | 1.98 | 1.95 |
| $Na_2O$ | 1.84 | 1.86 | 1.85 | 1.87 | 1.85 | 1.87 |
| $SiO_2$ | 54.39 | 54.78 | 58.48 | 58.27 | 62.42 | 68.22 |
| $SnO_2$ | 0.03 | 0.03 | 0.03 | 0.03 | 0.03 | 0.03 |
| $La_2O_3$ | 0.00 | 0.00 | 0.00 | 0.00 | 0.00 | 0.00 |
| $Li_2O$ | 11.90 | 9.95 | 11.95 | 10.01 | 9.95 | 10.04 |
| $ZrO_2$ | 0.00 | 0.00 | 0.00 | 0.00 | 0.00 | 0.00 |
| SrO | 0.00 | 0.00 | 0.00 | 0.00 | 0.00 | 0.00 |
| $Y_2O_3$ | 0.00 | 0.00 | 0.00 | 0.00 | 0.00 | 0.00 |
| $(Li_2O + Na_2O + MgO)/Al_2O_3$ | 0.88 | 0.89 | 0.87 | 0.87 | 0.86 | 0.99 |
| $Al_2O_3 + MgO + La_2O_3 + Y_2O_3 + ZrO_2$ | 35.92 | 35.36 | 31.96 | 32.05 | 28.00 | 25.98 |
| Formula I | 9.13 | 9.22 | 8.74 | 8.90 | 8.54 | 7.68 |
| $K_{1C}$ (CNSB) | | | | | | |
| $K_{1C}$ (Double Torsion) | | | | | | |
| Poisson's Ratio | 0.236 | 0.242 | 0.23 | 0.244 | 0.218 | 0.228 |
| E (GPa) | 82.61 | 84.68 | 79.17 | 81.44 | 79.17 | 77.72 |
| G (GPa) | 33.42 | 34.11 | 32.18 | 32.73 | 32.52 | 31.63 |

| Component (mol %) | BI | BJ | BK | BL | BM | BN |
|---|---|---|---|---|---|---|
| $Al_2O_3$ | 19.43 | 18.66 | 19.22 | 18.04 | 18.11 | 18.15 |
| $B_2O_3$ | 7.91 | 7.97 | 8.03 | 6.05 | 5.99 | 6.01 |
| CaO | 0.07 | 0.04 | 0.04 | 0.04 | 0.04 | 0.04 |
| $K_2O$ | 0.05 | 0.00 | 0.00 | 0.00 | 0.00 | 0.00 |
| MgO | 4.35 | 3.93 | 3.94 | 4.41 | 4.94 | 5.44 |
| $Na_2O$ | 1.90 | 1.91 | 1.91 | 1.92 | 1.92 | 1.93 |
| $SiO_2$ | 54.52 | 55.69 | 55.27 | 58.09 | 57.98 | 57.92 |
| $SnO_2$ | 0.04 | 0.05 | 0.05 | 0.05 | 0.05 | 0.06 |
| $La_2O_3$ | 0.00 | 0.00 | 0.00 | 0.00 | 0.00 | 0.00 |
| $Li_2O$ | 11.70 | 11.71 | 11.51 | 11.36 | 10.92 | 10.4 |
| $ZrO_2$ | 0.00 | 0.00 | 0.00 | 0.00 | 0.00 | 0.00 |
| SrO | 0.00 | 0.00 | 0.00 | 0.00 | 0.00 | 0.00 |
| $Y_2O_3$ | 0.00 | 0.00 | 0.00 | 0.00 | 0.00 | 0.00 |
| $(Li_2O + Na_2O + MgO)/Al_2O_3$ | 0.92 | 0.94 | 0.90 | 0.98 | 0.98 | 0.98 |
| $Al_2O_3 + MgO + La_2O_3 + Y_2O_3 + ZrO_2$ | 35.48 | 0.00 | 0.00 | 0.00 | 0.00 | 0.00 |
| Formula I | 9.06 | 8.95 | 9.05 | 8.61 | 8.65 | 8.69 |
| $K_{1C}$ (CNSB) | | 0.816 | | | | |
| $K_{1C}$ (Double Torsion) | | | | | | |
| Poisson's Ratio | | | | | | |
| E (GPa) | | 81.58 | 81.72 | 82.89 | 82.96 | 83.78 |
| G (GPa) | | 32.93 | 32.93 | 33.55 | 33.69 | 33.90 |

| Component (mol %) | BO | BP | BQ | BR | BS | BT |
|---|---|---|---|---|---|---|
| $Al_2O_3$ | 17.58 | 17.1 | 16.61 | 18.86 | 19.37 | 17.80 |
| $B_2O_3$ | 5.92 | 5.91 | 5.94 | 5.98 | 5.88 | 6.00 |
| CaO | 0.04 | 0.04 | 0.04 | 2.33 | 2.36 | 0.57 |
| $K_2O$ | 0.00 | 0.00 | 0.00 | 0.00 | 0.00 | 0.20 |
| MgO | 3.95 | 3.93 | 3.95 | 2.95 | 3.48 | 4.40 |
| $Na_2O$ | 1.91 | 1.92 | 1.92 | 1.9 | 1.89 | 1.70 |
| $SiO_2$ | 59.17 | 60.12 | 61.06 | 56.61 | 55.69 | 58.54 |
| $SnO_2$ | 0.05 | 0.05 | 0.05 | 0.03 | 0.03 | 0.09 |
| $La_2O_3$ | 0.00 | 0.00 | 0.00 | 0.00 | 0.00 | 0.00 |
| $Li_2O$ | 11.34 | 10.89 | 10.4 | 11.3 | 11.26 | 10.70 |
| $ZrO_2$ | 0.00 | 0.00 | 0.00 | 0.00 | 0.00 | 0.00 |

TABLE 1-continued

| | | | | | | |
|---|---|---|---|---|---|---|
| SrO | 0.00 | 0.00 | 0.00 | 0.00 | 0.00 | 0.00 |
| $Y_2O_3$ | 0.00 | 0.00 | 0.00 | 0.00 | 0.00 | 0.00 |
| $(Li_2O + Na_2O + MgO)/Al_2O_3$ | 0.98 | 0.98 | 0.98 | 0.86 | 0.86 | 0.00 |
| $Al_2O_3 + MgO + La_2O_3 + Y_2O_3 + ZrO_2$ | 0.00 | 0.00 | 0.00 | 0.00 | 0.00 | 0.00 |
| Formula I | 8.51 | 8.46 | 8.41 | 8.54 | 8.62 | 8.55 |
| $K_{1C}$ (CNSB) | | | | | | |
| $K_{1C}$ (Double Torsion) | | | | | | |
| Poisson's Ratio | | | | | | |
| E (GPa) | 81.99 | 81.23 | 81.30 | | | |
| G (GPa) | 33.28 | 33.14 | 33.07 | | | |

| Component (mol %) | BU | BV | BW | BX | BY | BZ |
|---|---|---|---|---|---|---|
| $Al_2O_3$ | 18.10 | 17.93 | 17.10 | 16.01 | 18.02 | 17.94 |
| $B_2O_3$ | 6.25 | 6.26 | 6.25 | 6.25 | 6.25 | 6.25 |
| CaO | 0.05 | 0.05 | 0.05 | 0.05 | 0.04 | 0.04 |
| $K_2O$ | 0.01 | 0.01 | 0.01 | 0.01 | 0.01 | 0.01 |
| MgO | 4.06 | 3.01 | 4.07 | 4.00 | 3.01 | 2.01 |
| $Na_2O$ | 2.02 | 2.01 | 2.00 | 2.02 | 2.01 | 2.00 |
| $SiO_2$ | 57.28 | 57.54 | 57.31 | 57.49 | 57.43 | 57.56 |
| $SnO_2$ | 0.06 | 0.06 | 0.05 | 0.05 | 0.05 | 0.05 |
| $La_2O_3$ | 0.00 | 0.00 | 0.00 | 0.00 | 0.00 | 0.00 |
| $Li_2O$ | 11.21 | 11.21 | 12.19 | 12.20 | 12.20 | 12.20 |
| $ZrO_2$ | 0.00 | 0.00 | 0.00 | 0.00 | 0.00 | 0.00 |
| SrO | 0.00 | 0.00 | 0.00 | 0.00 | 0.00 | 0.00 |
| $Y_2O_3$ | 0.00 | 0.00 | 0.00 | 0.00 | 0.00 | 0.00 |
| $TiO_2$ | 0.97 | 1.92 | 0.97 | 1.92 | 0.97 | 1.93 |
| $(Li_2O + Na_2O + MgO)/Al_2O_3$ | 0.96 | 0.91 | 1.07 | 1.14 | 0.96 | 0.00 |
| $Al_2O_3 + MgO + La_2O_3 + Y_2O_3 + ZrO_2$ | 0.00 | 0.00 | 0.00 | 0.00 | 0.00 | 0.00 |
| Formula I | 8.63 | 8.58 | 8.44 | 8.28 | 8.55 | 8.51 |
| $K_{1C}$ (CNSB) | | | | | | |
| $K_{1C}$ (Double Torsion) | | | | | | |
| Poisson's Ratio | 0.234 | 0.229 | 0.231 | | 0.232 | 0.227 |
| E (GPa) | 82.70 | 81.80 | 82.10 | | 81.70 | 80.70 |
| G (GPa) | 33.50 | 33.30 | 33.30 | | 33.20 | 32.90 |

| Component (mol %) | CA | CB | CC | CD | CE | CF |
|---|---|---|---|---|---|---|
| $Al_2O_3$ | 18.17 | 18.16 | 17.20 | 16.13 | 18.03 | 18.16 |
| $B_2O_3$ | 6.20 | 6.16 | 6.01 | 6.08 | 6.10 | 6.20 |
| CaO | 0.05 | 0.05 | 0.05 | 0.05 | 0.04 | 0.04 |
| $K_2O$ | 0.01 | 0.01 | 0.01 | 0.01 | 0.01 | 0.01 |
| MgO | 4.10 | 3.04 | 4.09 | 4.06 | 2.99 | 2.06 |
| $Na_2O$ | 2.01 | 2.01 | 2.01 | 2.03 | 2.02 | 2.02 |
| $SiO_2$ | 57.37 | 57.46 | 57.71 | 57.65 | 57.86 | 57.49 |
| $SnO_2$ | 0.05 | 0.05 | 0.05 | 0.05 | 0.05 | 0.05 |
| $La_2O_3$ | 0.00 | 0.00 | 0.00 | 0.00 | 0.00 | 0.00 |
| $Li_2O$ | 11.05 | 11.04 | 11.88 | 11.92 | 11.92 | 11.96 |
| $ZrO_2$ | 0.00 | 0.00 | 0.00 | 0.00 | 0.00 | 0.00 |
| SrO | 0.00 | 0.00 | 0.00 | 0.00 | 0.00 | 0.00 |
| $Y_2O_3$ | 0.98 | 2.01 | 0.99 | 2.01 | 0.98 | 2.01 |
| $(Li_2O + Na_2O + MgO)/Al_2O_3$ | 0.94 | 0.89 | 1.05 | 1.12 | 0.94 | 0.00 |
| $Al_2O_3 + MgO + La_2O_3 + Y_2O_3 + ZrO_2$ | 0.00 | 0.00 | 0.00 | 0.00 | 0.00 | 0.00 |
| Formula I | 8.64 | 8.61 | 8.44 | 8.28 | 8.54 | 8.54 |
| $K_{1C}$ (CNSB) | | | | | | |
| $K_{1C}$ (Double Torsion) | | | | | | |
| Poisson's Ratio | 0.232 | 0.231 | 0.232 | 0.236 | 0.234 | 0.233 |
| E (GPa) | 84.50 | 85.50 | 84.10 | 85.80 | 84.70 | 84.90 |
| G (GPa) | 34.30 | 34.80 | 34.10 | 34.70 | 34.30 | 34.40 |

Figure 3:
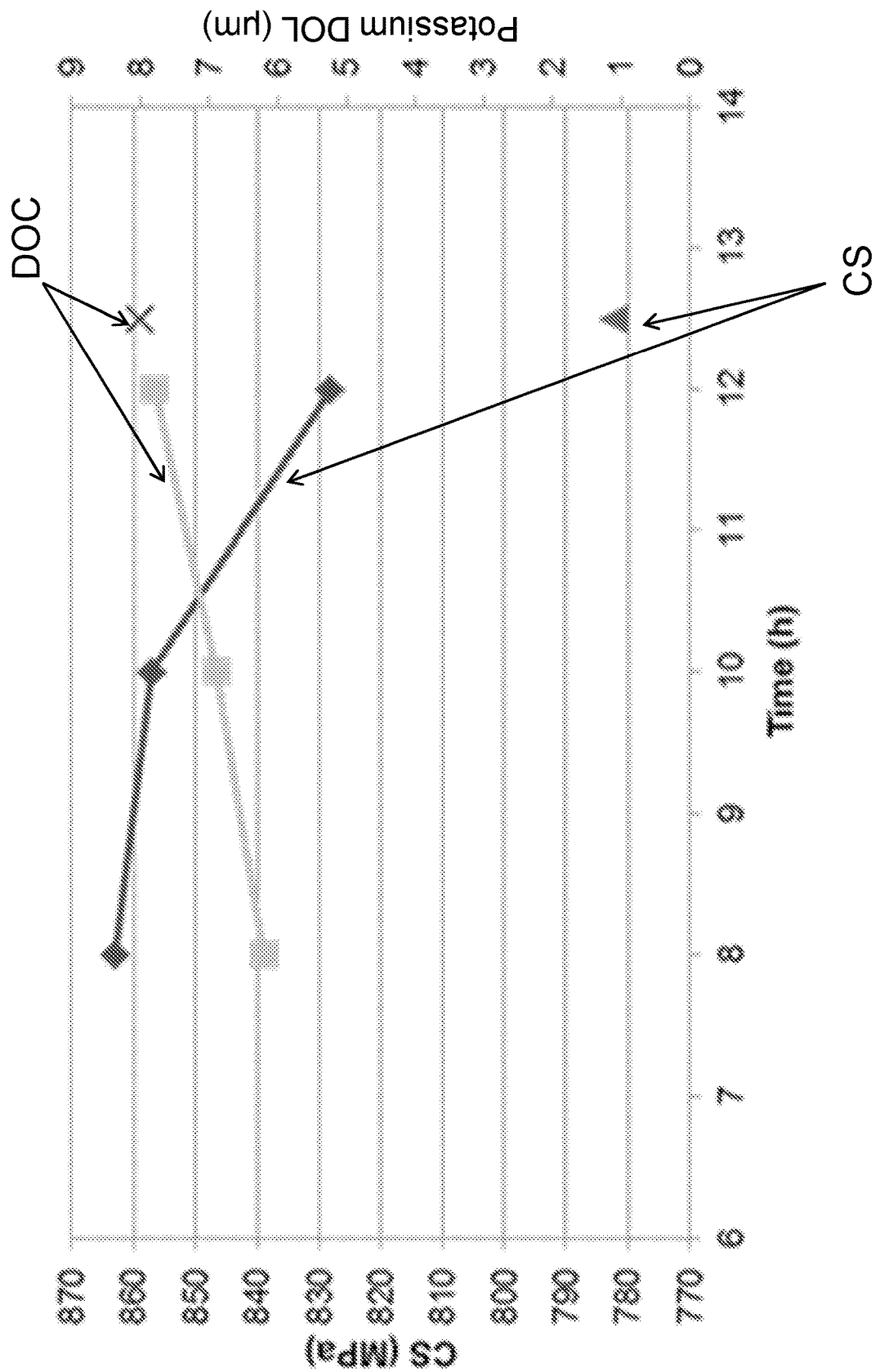
FIG. 3 is a plot of compressive stress and depth of compression as a function of ion exchange time for glass articles according to an embodiment.
Figure 4:
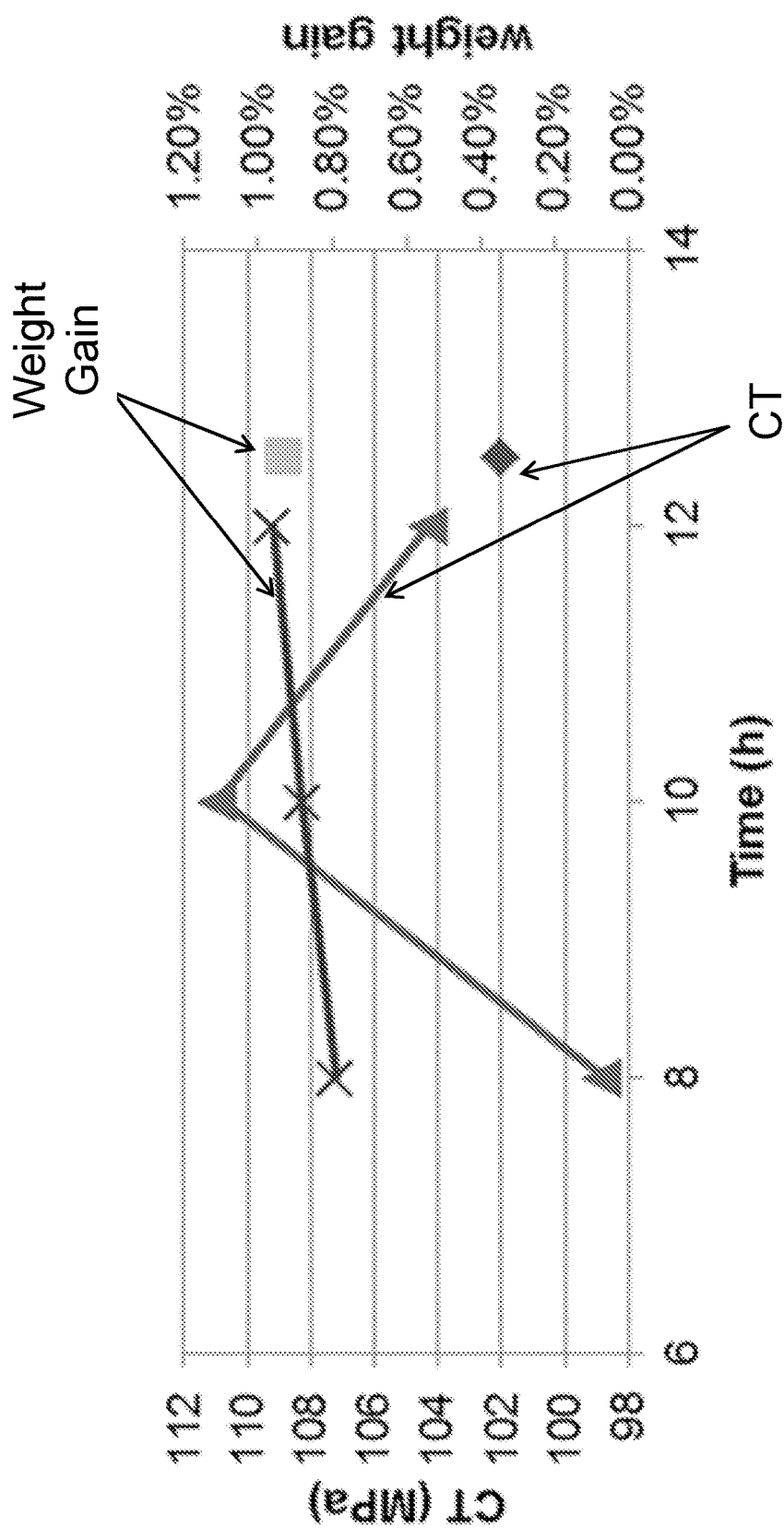
FIG. 4 is a plot of central tension and weight gain as a function of ion exchange time for glass articles according to an embodiment.

Glass articles with a thickness of 0.8 mm were formed with the composition of Sample W. The glass articles were ion exchanged in a bath containing 95 wt % $KNO_3$ and 5 wt % $NaNO_3$ at a bath temperature of 430° C. for 8 hours, 10 hours, 12 hours, and 12.5 hours. For the sake of discussion, these strengthened glass articles will be referred to as Glass Article W. The resulting compressive stress (CS) and potassium depth of layer (Potassium DOL) were measured as described herein, and are shown in FIG. 3. The central tension (CT) was also measured using SCALP as described herein and the weight gain due to the ion exchange was calculated, the results are shown in FIG. 4.

Figure 5:
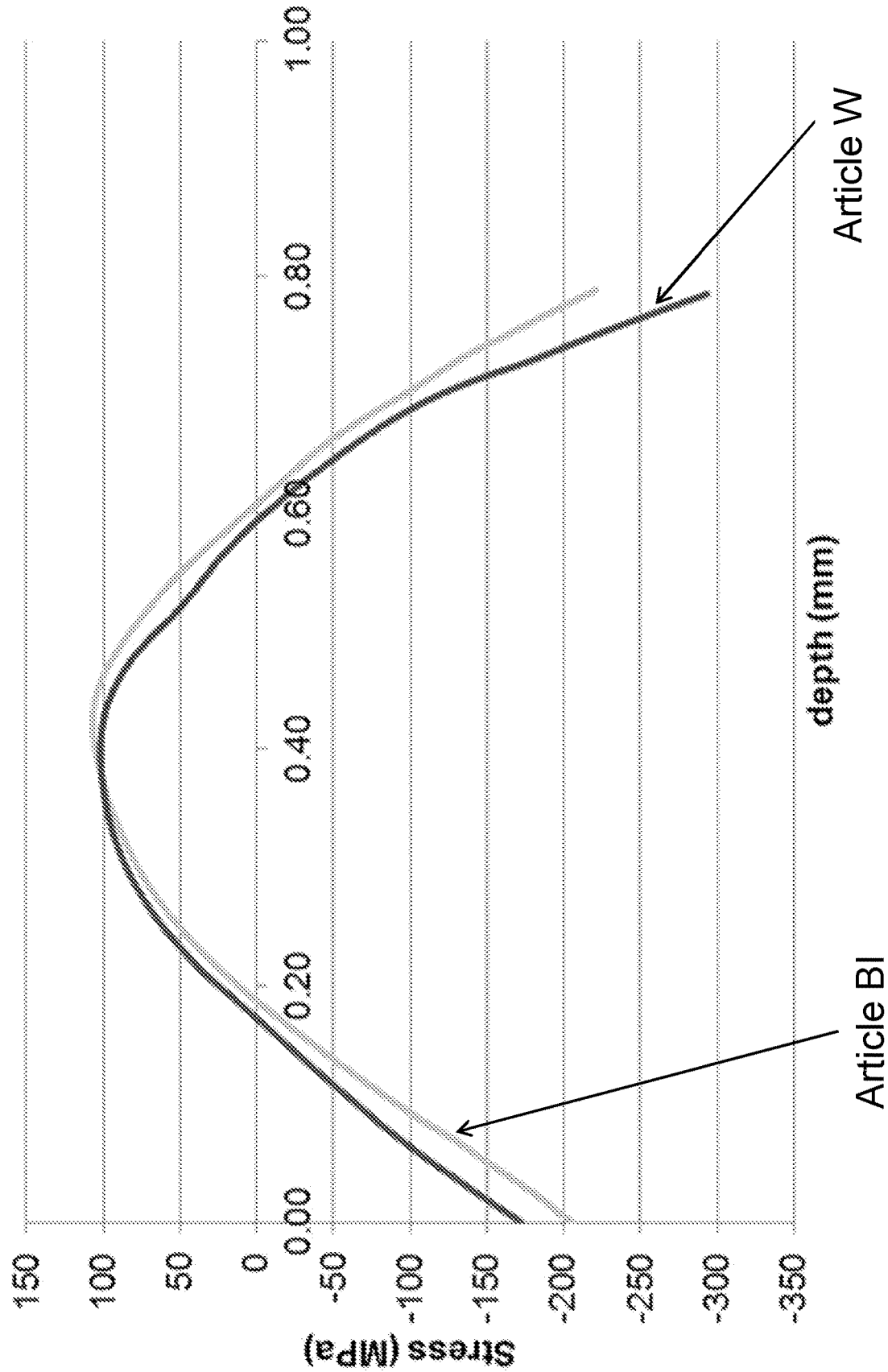
FIG. 5 is plot of stress as a function of depth below a surface of ion exchanged glass articles according to embodiments.

Glass articles with a thickness of 0.8 mm were formed with the composition of Sample BI. The glass articles were ion exchanged in a bath containing 95 wt % $KNO_3$ and 5 wt % $NaNO_3$ at a bath temperature of 450° C. for 16 hours. For the sake of discussion, these strengthened glass articles will be referred to as Glass Article BI. The stress profile of Glass Article BI was measured with SCALP as described herein and is shown in FIG. 5. The stress profile for the Glass Article W ion exchanged for 12.5 hours described above was also measured with SCALP and is shown in FIG. 5. In FIG. 5, compressive stress is shown as a negative value, contrary to the convention described above.

Figure 6:
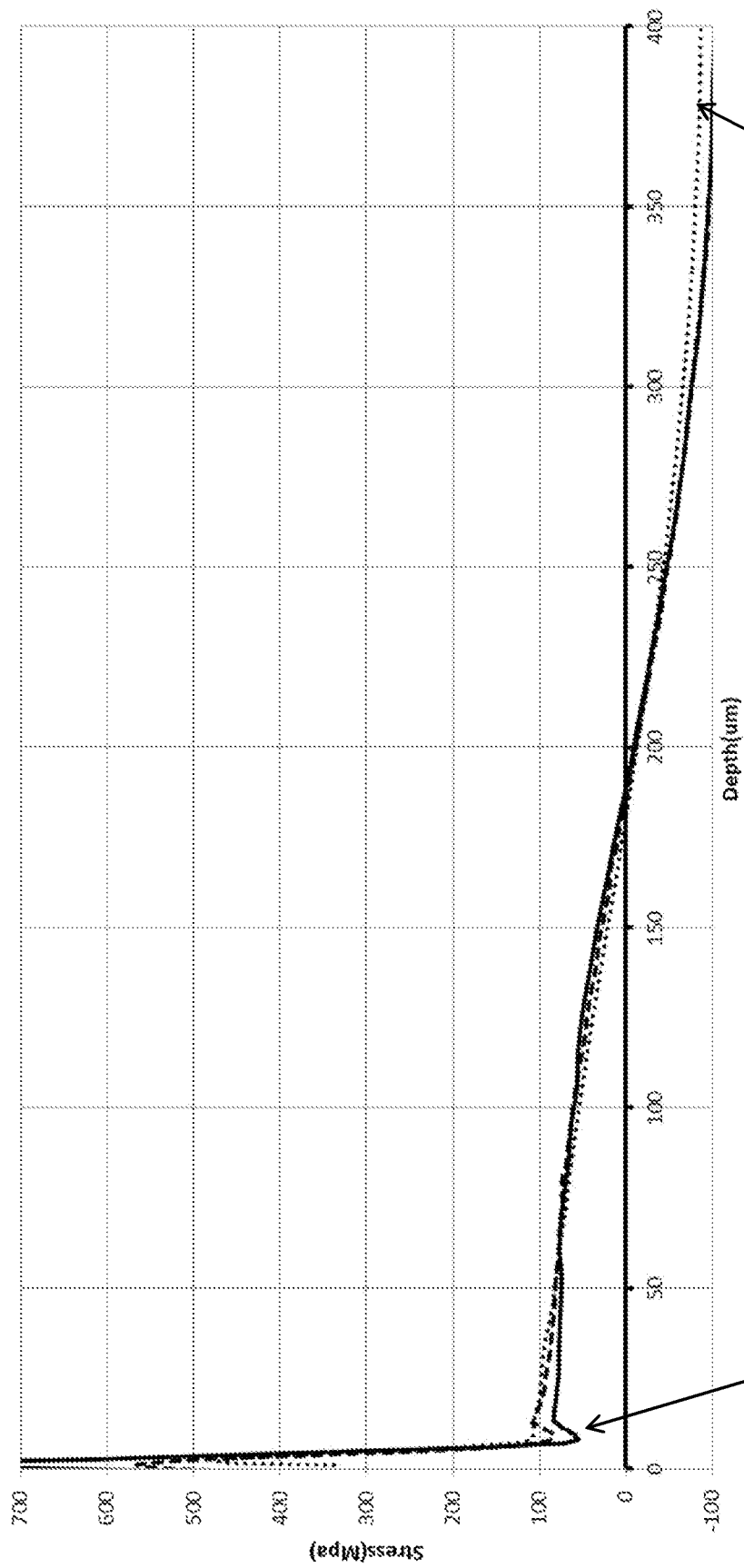
FIG. 6 is a plot of stress as a function of depth below a surface of ion exchanged glass articles according to embodiments.
Figure 7:
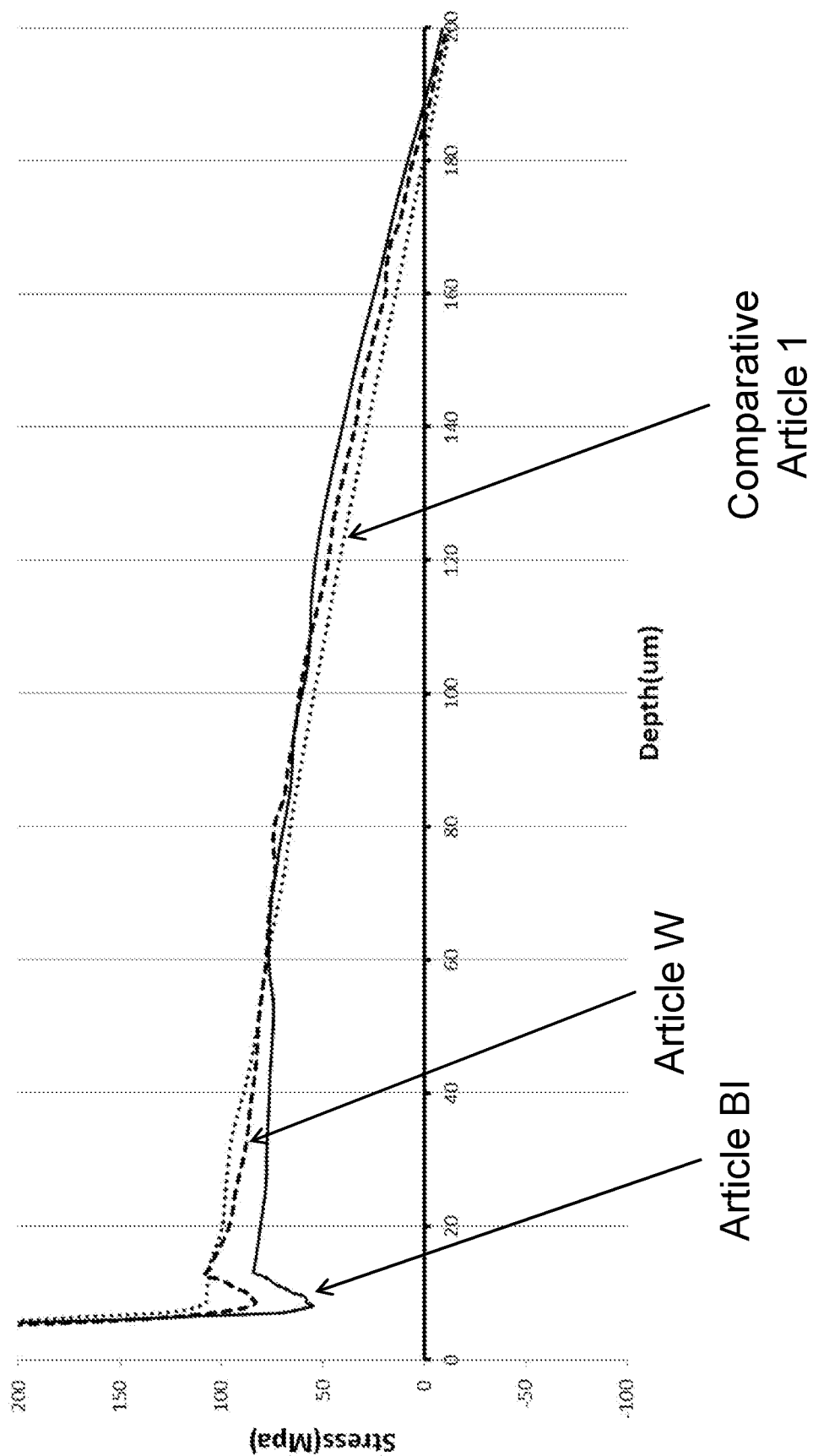
FIG. 7 is a detailed view of a portion of FIG. 6.

A comparative glass article with a thickness of 0.8 mm was formed with the following composition: 70.94 mol % $SiO_2$, 1.86 mol % $B_2O_3$, 12.83 mol % $Al_2O_3$, 2.36 mol % $Na_2O$, 8.22 mol % $Li_2O$, 2.87 mol % MgO, 0.83 mol % ZnO, and 0.06 mol % $SnO_2$. The glass articles were ion exchanged in a bath containing 93.5 wt % $KNO_3$ and 6.5 wt % $NaNO_3$ at a bath temperature of 430° C. for 4.5 hours. For the sake of discussion, this strengthened glass articles will be referred to as Comparative Article 1. The stress profile of Comparative Article 1 was measured with SCALP as described herein. The measured stress profiles of Comparative Article 1, Glass Article W ion exchanged for 12 hours, and Glass Article BI ion exchanged for 16 hours are shown in FIGS. 6 and 7, with FIG. 7 showing enhanced detail in the 0 μm to 200 μm depth region. As shown in FIGS. 3-7, the glass compositions described herein are capable of being ion exchanged to produce a desired stress profile.

All compositional components, relationships, and ratios described in this specification are provided in mol % unless otherwise stated. All ranges disclosed in this specification include any and all ranges and subranges encompassed by the broadly disclosed ranges whether or not explicitly stated before or after a range is disclosed.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A glass article, comprising:
   50 mol % to 69 mol % $SiO_2$;
   12.5 mol % to 25 mol % $Al_2O_3$;
   0 mol % to 8 mol % $B_2O_3$;
   0.5 mol % to 4 mol % CaO;
   greater than 0 mol % to 17.5 mol % MgO;
   0.5 mol % to 8 mol % $Na_2O$;
   0 mol % to 2.5 mol % $La_2O_3$; and
   greater than 8 mol % to 18 mol % $Li_2O$;
   wherein:
      $(Li_2O+Na_2O+MgO)/Al_2O_3$ is from 0.9 to less than 1.3; and
      $Al_2O_3+MgO+Li_2O+ZrO_2+La_2O_3+Y_2O_3$ is from greater than 23 mol % to less than 50 mol %.

2. The glass article of claim 1, comprising greater than 8 mol % to 16 mol % $Li_2O$.

3. The glass article of claim 1, further comprising $K_2O$.

4. The glass article of claim 1, comprising 0 mol % to 2 mol % $TiO_2$.

5. The glass article of claim 1, comprising 0 mol % to 2.5 mol % $ZrO_2$.

6. The glass article of claim 1, comprising 0 mol % to 1 mol % SrO.

7. The glass article of claim 1, comprising greater than 0 mol % to 12 mol % MgO.

8. The glass article of claim 1, comprising greater than 0.5 mol % to 17.5 mol % MgO.

9. The glass article of claim 1, comprising 14 mol % to 24 mol % $Al_2O_3$.

10. The glass article of claim 1, comprising 0.5 mol % to 8 mol % $B_2O_3$.

11. The glass article of claim 1, comprising 0 mol % to 2 mol % $Y_2O_3$.

12. The glass article of claim 1, wherein the glass article is substantially free of $P_2O_5$.

13. The glass article of claim 1, wherein $(Li_2O+Na_2O+MgO)/Al_2O_3$ is from 0.9 to 1.0.

14. The glass article of claim 1, wherein $Al_2O_3+MgO+Li_2O+ZrO_2+La_2O_3+Y_2O_3$ is from 25 mol % to 46 mol %.

15. The glass article of claim 1, wherein $5.631+0.148 \cdot Al_2O_3+0.142 \cdot B_2O_3-0.062 \cdot CaO-0.188 \cdot K_2O+0.030 \cdot MgO-0.099 \cdot Na_2O-0.043 \cdot Li_2O-0.188 \cdot P_2O_5+0.020 \cdot ZnO-0.062 \cdot SrO+0.200 \cdot ZrO_2 \geq 6.5$, wherein the value of each component is in mol %.

16. A consumer electronic product, comprising:
   a housing having a front surface, a back surface and side surfaces;
   electrical components provided at least partially within the housing, the electrical components including at least a controller, a memory, and a display, the display being provided at or adjacent the front surface of the housing; and
   a cover glass disposed over the display,
   wherein at least one of a portion of the housing or a portion of the cover glass comprises the glass article of claim 15.

17. The glass article of claim 1, wherein the glass article is characterized by at least one of the following:
   a $K_{1C}$ value measured by a chevron short bar method of at least 0.75; and
   a $K_{1C}$ value measured by a double torsion method of at least 0.8.

18. The glass article of claim 1, wherein the glass is fusion formable.

19. A glass article, comprising:
   50 mol % to 69 mol % $SiO_2$;
   12.5 mol % to 25 mol % $Al_2O_3$;
   0 mol % to 8 mol % $B_2O_3$;
   greater than 0 mol % to 4 mol % CaO;
   greater than 0 mol % to 17.5 mol % MgO;
   0.5 mol % to 8 mol % $Na_2O$;
   $K_2O$;
   0 mol % to 2.5 mol % $La_2O_3$; and
   greater than 8 mol % to 18 mol % $Li_2O$;
   wherein:
      $(Li_2O+Na_2O+MgO)/Al_2O_3$ is from 0.9 to less than 1.3; and
      $Al_2O_3+MgO+Li_2O+ZrO_2+La_2O_3+Y_2O_3$ is from greater than 23 mol % to less than 50 mol %.

20. The glass article of claim 19, comprising greater than 8 mol % to 16 mol % $Li_2O$.

21. The glass article of claim 19, comprising 0 mol % to 2 mol % $TiO_2$.

22. The glass article of claim 19, comprising 0 mol % to 2.5 mol % $ZrO_2$.

23. The glass article of claim 19, comprising 0 mol % to 1 mol % SrO.

24. The glass article of claim 19, comprising greater than 0 mol % to 12 mol % MgO.

25. The glass article of claim 19, comprising greater than 0.5 mol % to 17.5 mol % MgO.

26. The glass article of claim 19, comprising 14 mol % to 24 mol % $Al_2O_3$.

27. The glass article of claim 19, comprising 0.5 mol % to 8 mol % $B_2O_3$.

28. The glass article of claim 19, comprising 0 mol % to 2 mol % $Y_2O_3$.

29. The glass article of claim 19, wherein the glass article is substantially free of $P_2O_5$.

30. The glass article of claim 19, wherein $(Li_2O+Na_2O+MgO)/Al_2O_3$ is from 0.9 to 1.0.

31. The glass article of claim 19, wherein $Al_2O_3+MgO+Li_2O+ZrO_2+La_2O_3+Y_2O_3$ is from 25 mol % to 46 mol %.

32. The glass article of claim 19, The glass article of claims 1, wherein $5.631 +0.148 \cdot Al_2O_3+0.142 \cdot B_2O_3-0.062 \cdot CaO-0.188 \cdot K_2O+0.030 \cdot MgO-0.099 \cdot Na_2O$ −0.043·Li$_2$O −0.188·P$_2$O$_5$+0.020·ZnO−0.062·SrO+0.200·ZrO$_2$≥6.5, wherein the value of each component is in mol %.

33. The glass article of claim 19, wherein the glass article is characterized by at least one of the following:
- a K$_{1C}$ value measured by a chevron short bar method of at least 0.75; and
- a K$_{1C}$ value measured by a double torsion method of at least 0.8.

34. A glass article, comprising:
a composition at a center of the glass article comprising:
- 50 mol % to 69 mol % SiO$_2$;
- 12.5 mol % to 25 mol % Al$_2$O$_3$;
- 0 mol % to 8 mol % B$_2$O$_3$;
- greater than 0 mol % to 4 mol % CaO;
- greater than 0 mol % to 17.5 mol % MgO;
- 0.5 mol % to 8 mol % Na$_2$O;
- 0 mol % to 2.5 mol % La$_2$O$_3$; and
- greater than 8 mol % to 18 mol % Li$_2$O;

wherein:
- (Li$_2$O+Na$_2$O+MgO)/Al$_2$O$_3$ is from 0.9 to less than 1.3;
- Al$_2$O$_3$+MgO+Li$_2$O+ZrO$_2$+La$_2$O$_3$+Y$_2$O$_3$ is from greater than 23 mol % to less than 50 mol %; and
- the composition at the center of the glass article comprises:
  - 0.5 mol % to 4 mol % CaO; or
  - K$_2$O,
- a compressive stress region extending from a surface of the glass article to a depth of compression.

35. The glass article of claim 34, wherein the glass article comprises a compressive stress of at least 400 MPa.

36. The glass article of claim 34, wherein the depth of compression is at least 20% of a thickness of the glass article.

37. The glass article of claim 34, wherein the glass article comprises a maximum central tension of less than 85 MPa.

* * * * *

UNITED STATES PATENT AND TRADEMARK OFFICE
CERTIFICATE OF CORRECTION

PATENT NO. : 11,485,674 B2
APPLICATION NO. : 16/370002
DATED : November 1, 2022
INVENTOR(S) : Xiaoju Guo et al.

It is certified that error appears in the above-identified patent and that said Letters Patent is hereby corrected as shown below:

In the Claims

In Column 34, Lines 65-66, in Claim 32, after "The glass article of claim 19," delete "The glass article of claims 1,".

Signed and Sealed this
Sixteenth Day of July, 2024

Katherine Kelly Vidal
*Director of the United States Patent and Trademark Office*